United States Patent
Lee et al.

(10) Patent No.: US 9,648,635 B2
(45) Date of Patent: May 9, 2017

(54) SUBSCRIPTIONS SCHEDULING IN MULTI-SUBSCRIPTION DEVICES

(71) Applicant: QUALCOMM Incorporated, San Diego, CA (US)

(72) Inventors: Kuo-Chun Lee, San Diego, CA (US); Chih-Ping Hsu, San Diego, CA (US); Jack Shyh-Hurng Shauh, San Diego, CA (US); Sivaramakrishna Veerepalli, San Diego, CA (US); Reza Shahidi, San Diego, CA (US); Chintan Shirish Shah, San Diego, CA (US); Francis Ming-Meng Ngai, Louisville, CO (US); Daniel Amerga, San Diego, CA (US); Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 14/744,983

(22) Filed: Jun. 19, 2015

(65) Prior Publication Data
US 2016/0374108 A1    Dec. 22, 2016

(51) Int. Cl.
| H04W 72/12 | (2009.01) |
| H04W 72/00 | (2009.01) |
| H04L 12/18 | (2006.01) |
| H04W 76/00 | (2009.01) |
| H04W 88/06 | (2009.01) |

(Continued)

(52) U.S. Cl.
CPC ..... *H04W 72/1215* (2013.01); *H04L 12/1881* (2013.01); *H04W 72/005* (2013.01); *H04W 76/002* (2013.01); *H04W 68/005* (2013.01); *H04W 76/025* (2013.01); *H04W 88/06* (2013.01)

(58) Field of Classification Search
None
See application file for complete search history.

(56) References Cited

U.S. PATENT DOCUMENTS

| 7,957,352 B2 | 6/2011 | Vanghi et al. |
| 8,923,244 B2 | 12/2014 | Tinnakornsrisuphap et al. |

(Continued)

FOREIGN PATENT DOCUMENTS

| WO | 2011109750 A1 | 9/2011 |

OTHER PUBLICATIONS

International Search Report and Written Opinion—PCT/US2016/032781—ISA/EPO—Jul. 27, 2016.

*Primary Examiner* — Brian Roberts
(74) *Attorney, Agent, or Firm* — Foley & Lardner LLP

(57) ABSTRACT

Embodiments described herein relate to systems and methods for scheduling subscriptions in a user equipment (UE) having at least a first receive radio and a second receive radio, including receiving, by the first receive radio, a broadcast activity for a first subscription and receiving, by the second receive radio, a reception activity for a second subscription. A trigger event is detected while the broadcast activity for the first subscription is being received by the first receive radio and the reception activity for the second subscription is being received by the second receive radio. In response to detecting the trigger event, the reception activity for the second subscription is received by the first receive radio and the broadcast activity for the first subscription is received by the second receive radio.

26 Claims, 15 Drawing Sheets

(51) Int. Cl.
    *H04W 68/00*     (2009.01)
    *H04W 76/02*     (2009.01)

(56) References Cited

U.S. PATENT DOCUMENTS

| | | | |
|---|---|---|---|
| 9,461,684 B2* | 10/2016 | Krishnamoorthy | H04B 1/3816 |
| 9,462,543 B2* | 10/2016 | Ramkumar | H04W 48/20 |
| 2010/0311339 A1* | 12/2010 | Chung | H04B 1/0053 |
| | | | 455/41.3 |
| 2011/0077031 A1* | 3/2011 | Kim | H04B 1/3816 |
| | | | 455/458 |
| 2012/0207040 A1 | 8/2012 | Comsa et al. | |
| 2012/0315896 A1 | 12/2012 | Syrjaerinne et al. | |
| 2013/0029720 A1 | 1/2013 | Clevorn | |
| 2014/0341184 A1* | 11/2014 | Dhanda | H04W 72/048 |
| | | | 370/331 |
| 2015/0119103 A1 | 4/2015 | Ngai et al. | |

\* cited by examiner

| PORT OPTIONS 302 | FIRST RECEIVE RADIO 304 | SECOND RECEIVE RADIO 306 | TRANSMIT RADIO 308 | TRIGGER 310 |
|---|---|---|---|---|
| Port Option 1A 321a | First Subscription 330a | Second Subscription 340a | N/A | N/A |
| Port Option 2A 322a | Second Subscription 340a | First Subscription 330a | Second Subscription 340a | Second Subscription-Related Trigger 360a |

FIG. 3A

| PORT OPTIONS 302 | FIRST RECEIVE RADIO 304 | SECOND RECEIVE RADIO 306 | TRANSMIT RADIO 308 | TRIGGER 310 |
|---|---|---|---|---|
| Port Option 1B 321b | eMBMS 330b | GSM 340b and/or 1x 340c | N/A | N/A |
| Port Option 2B 322b | GSM 340b | eMBMS 330b | GSM 340b | GSM Trigger Event 360b |
| Port Option 2C 322c | 1x 340c | eMBMS 330b | 1x 340c | 1x Trigger Event 360c |

| PORT OPTIONS 502 | FIRST RECEIVE RADIO 504 | SECOND RECEIVE RADIO 506 | TRANSMIT RADIO 508 | TRIGGER 510 |
|---|---|---|---|---|
| Port Option 3A 523a | First Subscription 530a | Second Subscription 540a | N/A | N/A |
| Port Option 4A 524a | First Subscription 530a | Second Subscription 540a | Second Subscription 540a | Second Subscription-Related Trigger 560a |

| PORT OPTIONS 502 | FIRST RECEIVE RADIO 504 | SECOND RECEIVE RADIO 506 | TRANSMIT RADIO 508 | TRIGGER 510 |
|---|---|---|---|---|
| Port Option 3B 523b | eMBMS 530b | GSM 540b and/or 1x 540c | N/A | N/A |
| Port Option 4B 524b | eMBMS 530b | GSM 540b | GSM 540b | GSM Trigger Event 560b |
| Port Option 4C 524c | eMBMS 530b | 1x 540c | 1x 540c | 1x Trigger Event 560c |

FIG. 5B

| PORT OPTIONS 702 | FIRST RECEIVE RADIO 704 | SECOND RECEIVE RADIO 706 | TRANSMIT RADIO 708 | TRIGGER 710 |
|---|---|---|---|---|
| Port Option 5A 725a | First Subscription 730a Broadcast Activity 740a | First Subscription 730a Second Subscription 750a | First Subscription 730a | N/A |
| Port Option 6A 726a | First Subscription 730a Second Subscription 750a | Broadcast Activity 740a | First Subscription 730a | Broadcast-Related Trigger 760a |

| PORT OPTIONS 702 | FIRST RECEIVE RADIO 704 | SECOND RECEIVE RADIO 706 | TRANSMIT RADIO 708 | TRIGGER 710 |
|---|---|---|---|---|
| Port Option 5B 725b | LTE 730b eMBMS 740b | LTE 730b 1x 750b GSM 750c | LTE 730b | N/A |
| Port Option 6B 726b | LTE 730b 1x 750b GSM 750c | eMBMS 740b | LTE 730b | eMBMs on C-SCell 760b |
| Port Option 6C 726c | LTE 730b 1x 750b GSM 750c | LTE 730b eMBMS 740b | LTE 730b | eBMBs on SCell 760c |

SUBSCRIPTIONS SCHEDULING IN MULTI-SUBSCRIPTION DEVICES

BACKGROUND

1. Field

Embodiments described herein generally relate to transmitting or receiving via two or more radio access technologies (RATs) enabled in a user equipment (UE), and more specifically, to scheduling port options for the two or more RATs.

2. Background

A UE, such as a mobile phone device, may include a plurality of subscriber identify modules (SIMs). For example, when two or more SIMs in a multi-SIM UE are active, the UE may be a multi-SIM-multi-active (MSMA) UE. When one SIM in a multi-SIM UE is active while the rest of the SIM(s) is standing by, the UE may be a multi-SIM-multi-standby (MSMS) UE. Each SIM may be provided a subscription to a radio access technology (RAT), such as Wideband Code Division Multiple Access (WCDMA), Global Standard for Mobile (GSM), Long Term Evolution (LTE), Code Division Multiple Access (CDMA) 1× Radio Transmission Technology (1×), and the like. In particular embodiments, LTE may enable an evolved Multimedia Broadcast Multicast Service (eMBMS), which is an interface specification for LTE.

Different ports (paths) of the UE may be assigned to different subscriptions in various modes. In some cases, when two or more subscriptions are provided by a multi-SIM UE, a subscription may compete for the use of limited reception/transmission hardware. For example, when a first subscription (e.g., GSM, 1×, or the like) is undertaking high priority reception (e.g., call, short messaging service (SMS), location update (LU), page monitoring, or the like), the stack for the second subscription (e.g., LTE, eMBMS, or the like) may be suspended or halted tentatively.

The services for the second subscription may be suspended or halted even when there is additional reception hardware available for usage. Such suspension or halt may cause inefficiency and negative user experience for services provided by the second subscription. For example, when the second subscription is used for multimedia data transmission or reception, interruption and pause in the data stream may cause considerable negative user experience for the user of the UE.

Accordingly, systems and methods for efficiently scheduling activities of two or more subscriptions in a multi-SIM context may be desired.

SUMMARY

Some embodiments relate to a method for scheduling subscriptions in a user equipment (UE) having at least a first receive radio and a second receive radio, including: receiving, by the first receive radio, a broadcast activity for a first subscription, and receiving, by the second receive radio, a reception activity for a second subscription. The method further includes detecting a trigger event while the broadcast activity for the first subscription is being received by the first receive radio and the reception activity for the second subscription is being received by the second receive radio. In response to detecting the trigger event, receiving, by the first receive radio, the reception activity for the second subscription. Also in response to detecting the trigger event, receiving, by the second receive radio, the broadcast activity for the first subscription.

In some embodiments, the trigger event is associated with the second subscription.

In various embodiments, the trigger event is detecting at least one of: a call via the second subscription, Short Messaging Service (SMS) via the second subscription, and Location Update (LU) via the second subscription.

In some embodiments, the reception activity for the second subscription includes a first reception activity and a second reception activity. The first reception activity is received prior to detecting the trigger event. The second reception activity is receive in response to detecting the triggering event.

According to some embodiments, the first reception activity and the second reception activity are different reception activities.

In some embodiments, the first reception activity includes receiving pages of the second subscription.

According to some embodiments, the second reception activity includes at least one of receiving a call via the second subscription, receiving a SMS via the second subscription, and receiving a LU via the second subscription.

In various embodiments, the broadcast activity for the first subscription is an evolved Multimedia Broadcast Multicast Service (eMBMS) broadcast activity.

According to some embodiments, the second subscription is at least one of a Global Standard for Mobile (GSM) subscription and Code Division Multiple Access 1× Radio Transmission Technology (1×) subscription.

In some embodiments, the method further includes transmitting, by a transmit radio of the UE, transmission activity for the second subscription in response to detecting the trigger event.

In various embodiments, the method further includes: in response to the trigger event, continuing to receive, by the first receive radio, broadcast activity for the first subscription. Also in response to the trigger event, continuing to receive, by the second receive radio, reception activity for the second subscription.

In some embodiments, the method further include transmitting, by a transmit radio of the UE, transmission activity for the second subscription in response to detecting the trigger event.

Various embodiments relate to a system for scheduling subscriptions in a UE having at least a first receive radio and a second receive radio, including: the first receive radio, the second receive radio, and a scheduling unit. The scheduling unit configures the first receive radio to receive a broadcast activity for a first subscription. The scheduling unit configures the second receive radio to receive a reception activity for a second subscription. The scheduling unit is configured detect a trigger event while the broadcast activity for the first subscription is being received by the first receive radio and the reception activity for the second subscription is being received by the second receive radio. In response to detecting the trigger event: the scheduling unit configures the first receive radio to receive the reception activity for the second subscription. Also in response to detecting the trigger event, the scheduling unit configures the second receive radio to receive the broadcast activity for the first subscription.

According to some embodiments, the trigger event is detecting at least one of: a call via the second subscription, SMS via the second subscription, and LU via the second subscription.

In some embodiments, the reception activity for the second subscription includes a first reception activity and a second reception activity. The first reception activity is received prior to detecting the trigger event. The second reception activity is receive in response to detecting the triggering event.

According to some embodiments, the first reception activity and the second reception activity are different reception activities.

In various embodiments, the second reception activity includes at least one of: receiving a call via the second subscription, receiving a SMS via the second subscription, and receiving a LU via the second subscription.

In some embodiments, the scheduling unit further configures the first receive radio to continue receiving the broadcast activity for the first subscription. The scheduling unit further configures the second receive radio to continue to receiving reception activity for the second subscription.

In various embodiments, a method for scheduling subscriptions in a UE having at least a first receive radio and a second receive radio, including: receiving, by the first receive radio, a broadcast activity and receiving, by a second receive radio, a reception activity. An indication that the broadcast activity is to be received on the second receive radio is received while (a) receiving, by the first receive radio, the broadcast activity and (b) receiving, by the second receive radio, the reception activity. Whether an expected collision will occur between the broadcast activity and the reception activity is determined. The first receive radio receives the reception activity in response to determining that the expected collision will occur between the broadcast activity and the reception activity.

In some embodiments, the method further including receiving, by the second receive radio, the broadcast activity in response to determining that the expected collision will occur between the broadcast activity and the reception activity.

In some embodiments, the method further includes halting to receive, by the second receive radio, activity for a subscription associated with the broadcast activity.

In some embodiments, the subscription is a LTE subscription.

In some embodiments, the method further includes receiving, by the first receive radio and the second receive radio, a subscription associated with the broadcast activity prior to determining whether the expected collision will occur.

In some embodiments, the method further includes continuing to receive, by the first receive radio and the second receive radio, a subscription associated with the broadcast activity after determining whether the expected collision will occur.

In some embodiments, the broadcast activity is an eMBMS broadcast activity.

In some embodiments, the reception activity is associated with at least one of: a GSM subscription; and a 1× subscription.

In some embodiments, receiving the indication that the broadcast activity is to be received on the second receive radio includes receiving a request that the broadcast activity is to be received on a Supplemental Component Carrier (SCC).

In various embodiments, the method further includes transmitting, by a transmit radio, a transmission activity, wherein the indication is received while the transmission activity is being transmitted.

In some embodiments, the method further includes receiving, by the first receive radio, the broadcast activity in response to determining that the expected collision will not occur between the broadcast activity and the reception activity. The method further includes receiving, by the second receive radio, the reception activity in response to determining that the expected collision will not occur between the broadcast activity and the reception activity.

According to some embodiments, a system for scheduling subscriptions in a UE is described, including a first receive radio, a second receive radio, and a scheduling unit. The scheduling unit is configured to cause the first receive radio to receive a broadcast activity. The scheduling unit is configured to cause the second receive radio to receive a reception activity. The scheduling unit is configured to receiving an indication that the broadcast activity is to be received on the second receive radio while (a) the broadcast activity is received by the first receive radio, and (b) the reception activity is received by the second receive radio. The scheduling unit is configured to determine whether an expected collision will occur between the broadcast activity and the reception activity. The scheduling unit is configured to cause the first receive radio to receive the reception activity in response to determining that the expected collision will occur between the broadcast activity and the reception activity.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

FIG. 3A is a table illustrating examples of portion options according to various embodiments.

FIG. 3B is a table illustrating examples of various port options according to various embodiments.

FIG. 5A is a table illustrating examples of port options according to various embodiments.

FIG. 5B is a table illustrating examples of various port options according to various embodiments.

FIG. 7A is a table illustrating examples of port options according to various embodiments.

FIG. 7B is a table illustrating examples of various port options according to various embodiments.

DETAILED DESCRIPTION

Figure 1:
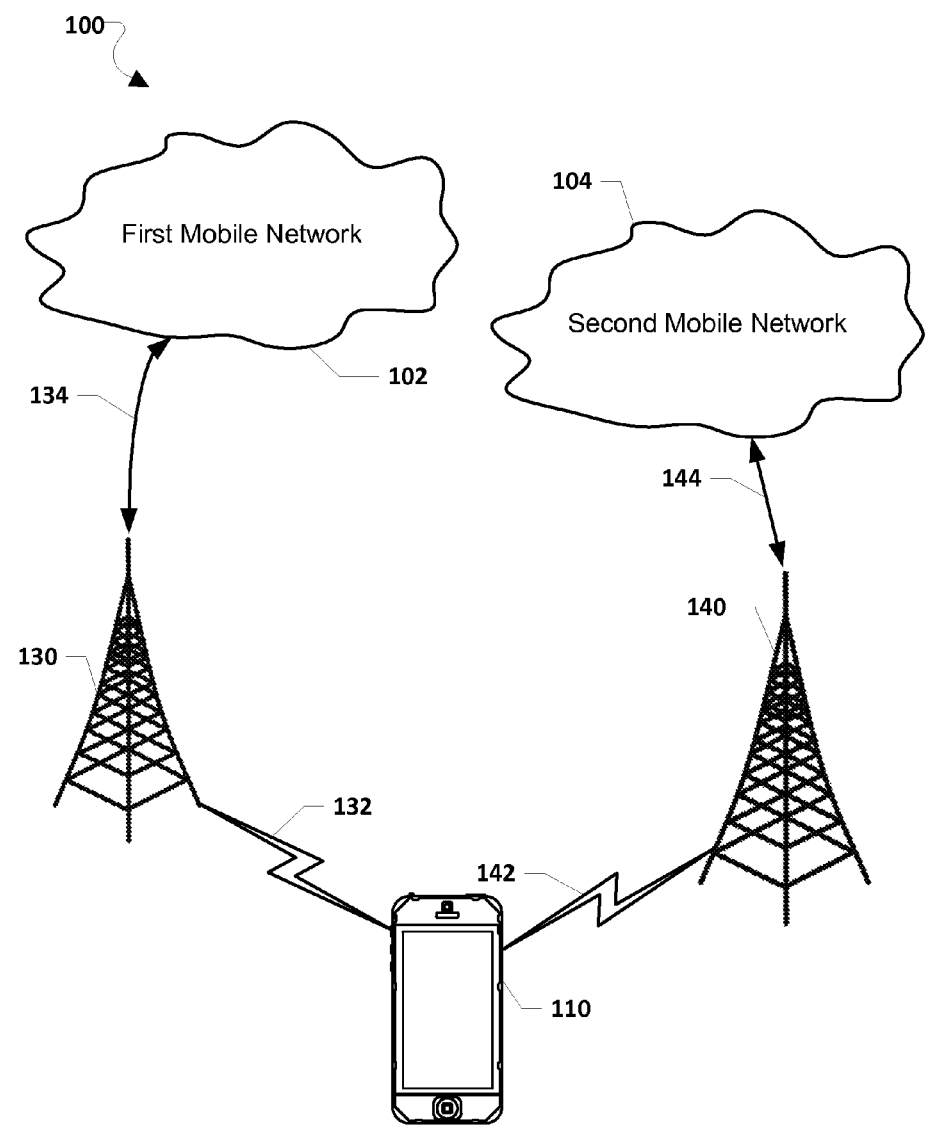
FIG. 1 is a schematic diagram of a communication system in accordance with various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Some modern communication devices, referred to herein as a user equipment (UE), communication device, or mobile station (MS), may include any one or all of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices. Such devices may include at least one SIM, a programmable processor, memory, and circuitry for connecting to two or more mobile communication networks simultaneously.

A UE may include one or more subscriber identity modules (SIMs) that provide a user of the UE with access to one or multiple separate mobile communication networks. The mobile communication networks are supported by radio access technologies (RATs). Examples of RATs include, but are not limited to, Frequency Division Multiple Access (FDMA), Time Division Multiple Access (TDMA), Code Division Multiple Access (CDMA), Universal Mobile Telecommunications Systems (UMTS) (particularly, Wideband Code Division Multiple Access (WCDMA), Long Term Evolution (LTE), Global System for Mobile Communications (GSM), General Packet Radio Service (GPRS), Wi-Fi, Personal Communications Service (PCS), or other protocols that may be used in a wireless communications network or a data communications network.

A UE provided with a plurality of SIMs and connected to two or more separate (or same) RATs using a same set of transmission hardware (e.g., radio-frequency (RF) transceivers) is a multi-SIM multi-standby (MSMS) communication device. In one example, the MSMS communication device may be a dual-SIM dual-standby (DSDS) communication device, which may include two SIM cards/subscriptions that may both be standing by, or one is active when the other one is standing by. In another example, the MSMS communication device may be a triple-SIM-triple-standby (TSTS) communication device, which includes three SIM cards/subscriptions that may all be standing by, or two may be standing by when the third one is active. In other examples, the MSMS communication device may be other suitable multi-SIM communication devices, with, for example, four or more SIMs, such that when one is active, the others may be standing by.

On the other hand, a UE that includes a plurality of SIMs and connects to two or more separate (or same) RATs using two or more separate sets of transmission hardware is termed a multi-SIM multi-active (MSMA) communication device. An example MSMA communication device is a dual-SIM dual-active (DSDA) communication device, which includes two SIM cards/subscriptions. Both SIMs may remain active. In another example, the MSMA device may be a triple-SIM-triple-active (TSTA) communication device, which includes three SIM cards/subscriptions. All three SIMs may remain active. In other examples, the MSMA communication device may be other suitable multi-SIM communication devices with four or more SIMs, for which all SIMs may be active.

Embodiments described herein relate to a multi-SIM context, such as, but not limited to, the MSMS and MSMA contexts. For example, in the multi-SIM context, each subscription may be configured to acquire service from a base station (associated with a given cell).

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "SIM" may also be used herein as a shorthand reference to the communication service associated with and enabled by the information (e.g., in the form of various parameters) stored in a particular SIM as the SIM and the communication network, as well as the services and subscriptions supported by that network, correlate to one another.

Embodiments described herein relate to a multi-SIM, multi-subscription UE (e.g., a MSMS UE or MSMA UE) configured to transmit or receive via two or more RATs. In particular embodiments, the UE may include two receive radios (in a dual-receive context) and at least one transmit radio. Each of the receive radios may include two reception paths: a primary (PRx) path and a diversity (DRx) path. The UE may include various chips for regulating, managing, and scheduling usage of the receive radios and the at least one transmit radio. For example, the UE may include at least a radio frequency (RF) front end, RF transceiver chip, and a baseband chip. The RF transceiver chip may be configured to perform processes described herein.

Initially, a broadcast activity (e.g., eMBMS activities) for a first subscription (e.g., LTE) may be received via the first receive radio while a reception activity of a second subscription (e.g., GSM or 1×) may be received via the second receive radio. The first receive radio and the second receive radio may be as assigned by the RF transceiver chip to receive the broadcast activity and the reception activity of the subscriptions. When a trigger event occurs, the reception activity of the second subscription may be assigned (after a frequency change by the RF transceiver chip) to the first receive radio, which may perform better (e.g., have better data rate) than the second receive radio. This is because the trigger event may warrant high-priority transmission of the reception activity of the second subscription. The trigger event may be, for example, detecting a call, SMS, LU, and/or the like for the second subscription. Conventionally, when the trigger event occurs, the broadcast activity for the first subscription may be suspended (i.e., not assigned to receive by the RF transceiver chip) according to conventional port assignment.

According to some embodiments, the broadcast activity for the first subscription is assigned, by the RF transceiver chip, to receive with the second receive radio in response to the trigger event, while the reception activity of the second subscription is assigned by the RF transceiver chip to receive with the first receive radio. As such, the broadcast activity for the first subscription and the reception activity of the second subscription may be received simultaneously. The first subscription may perform services such as page monitoring, Earth Tsunami Warning Service (ETWS), Commercial Mobile Alert System (CMAS), and/or the like. The RF transceiver chip may assign the transmit radio of the UE to the reception activity of the second subscription (e.g., in the event of a call via the second subscription). Therefore, the first subscription may not be able to transmit (e.g., performing call notifications) when there is only one transmit radio. In a UE where two or more transmit radio may be provided, the first subscription may be assigned by the RF transceiver chip to transmit on the second transmit radio.

According to some embodiments, the reception activity of the second subscription may continue to receive via the second receive radio, instead of being reassigned to the first receive radio in response to the trigger event. The broadcast activity for the first subscription may continue to receive via the first receive radio when the trigger event occurs. The broadcast activity for the first subscription and the reception activity of the second subscription may be received simultaneously without reassigning (i.e., switching) the receive radios.

According to some embodiments, the broadcast activity for one subscription may compete with the reception activity of another subscription when received on a same receive radio, as in the cases of collision. In response to detecting the collision or determining the expected collision between the broadcast activity and the reception activity, the RF transceiver chip may reassign the reception activity to receive via another receive radio. Given that one of the two competing activities is assigned to another receive radio, the expected collisions and negative user experience may be avoided for the broadcast activity.

Various embodiments may be implemented with a communication system 100, an example of which is illustrated in FIG. 1. A first mobile network 102 and a second mobile network 104 typically each may include a plurality of cellular base stations (e.g., a first base station 130 and a second base station 140). A UE 110 may be in communication with the first mobile network 102 through a first cellular connection 132 to the first base station 130. The UE 110 may also be in communication with the second mobile network 104 through a second cellular connection 142 to the second base station 140. The first base station 130 may be in communication with the first mobile network 102 over a wired or wireless connection 134. The second base station 140 may be in communication with the second mobile network 104 over a wired or wireless connection 144.

Each of the first cellular connection 132 and the second cellular connection 142 may be made through two-way wireless communication links. Each of the wireless communication links may be enable by FDMA, TDMA, CDMA, UMTS (particularly, WCDMA, LTE, 1×, and the like), GSM, GPRS, Wi-Fi, PCS, or another protocol used in a wireless communications network or a data communications network. By way of illustrating with a non-limiting example, the first cellular connection 132 may be LTE enabling eMBMS features while the second cellular connection 142 may be a GSM or 1× subscription. In some embodiments, the first cellular connection 132 and the second cellular connection 142 may be associated with different subscriptions. In other embodiments, the first cellular connection 132 and the second cellular connection 142 may be associated with same subscriptions.

Each of the first base station 130 and the second base station 140 may include at least one antenna group or transmission station located in the same or different areas. The at least one antenna group or transmission station may be associated with signal transmission and reception. Each of the first base station 130 and the second base station 140 may include one or more processors, modulators, multiplexers, demodulators, demultiplexers, antennas, and the like for performing the functions described herein. In some embodiments, the first base station 130 and the second base station 140 may be an access point, Node B, evolved Node B (eNode-B or eNB), base transceiver station (BTS), or the like.

In various embodiments, the UE 110 may be configured to access the first mobile network 102 and the second mobile network 104 by virtue of the multi-SIM and/or the multi-mode SIM configuration of the UE 110. When a SIM corresponding to a subscription is provided in the UE 110, the UE 110 may access the mobile communication network associated with that subscription based on the information stored on the SIM(s).

While the UE 110 is shown connected to two mobile networks 102, 104, in other embodiments (not shown), the UE 110 may connect to three or more mobile networks (each of which may be a network such as, but not limited to, the mobile networks 102, 104) in a manner similar to those described above.

In some embodiments, the UE 110 may establish a wireless connection with a peripheral device (not shown) used in connection with the UE 110. For example, the UE 110 may communicate over a Bluetooth® link with a Bluetooth-enabled personal computing device (e.g., a "smart watch"). In some embodiments, the UE 110 may establish a wireless connection with a wireless access point (not shown), such as over a Wi-Fi connection. The wireless access point may be configured to connect to the Internet or another network over a wired connection.

Figure 2:
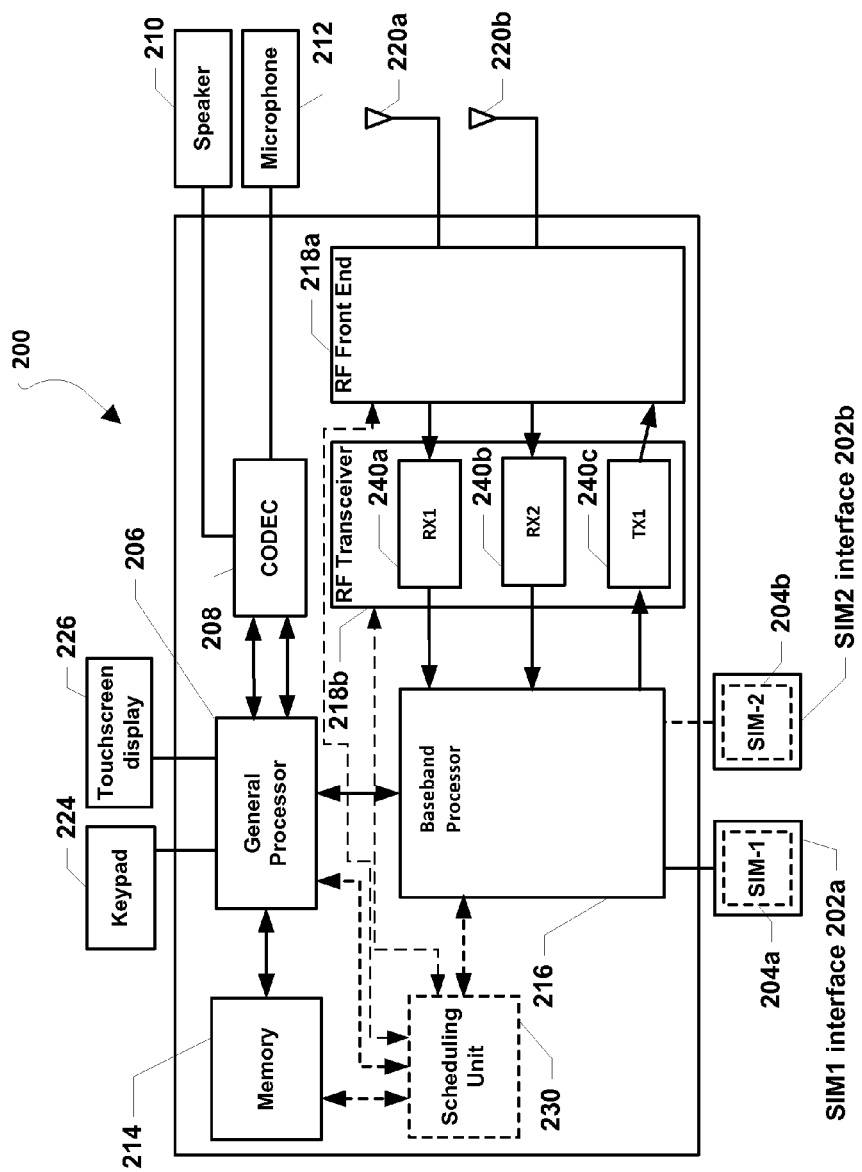
FIG. 2 is a component block diagram of an example of a user device (UE) according to various embodiments.

FIG. 2 is a functional block diagram of a UE 200 suitable for implementing various embodiments. According to various embodiments, the UE 200 may be a device such as, but not limited to, the UE 110 as described with reference to FIG. 1. Referring to FIGS. 1-2, the UE 200 may include a first SIM interface 202a, which may receive a first identity module SIM-1 204a that is associated with a first subscription. The UE 200 may also include a second SIM interface 202b, which may receive a second identity module SIM-2 204b that is associated with a second subscription. In some embodiments, the first subscription may be different from the second subscription. In other embodiments, the first subscription may be a same subscription as the second subscription.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a CPU, ROM, RAM, EEPROM and I/O circuits. An Integrated Circuit Card Identity (ICCID) SIM serial number may be printed on the SIM card for identification. However, a SIM may be implemented within a portion of memory of the UE 200, and thus need not be a separate or removable circuit, chip, or card.

A SIM used in various embodiments may store user account information, an IMSI, a set of SIM application toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

The UE 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. The general purpose processor 206 may include any suitable data processing device, such as a microprocessor. In the alternative, the general purpose processor 206 may be any suitable electronic processor, controller, microcontroller, or state machine. The general purpose processor 206 may also be implemented as a combination of computing devices (e.g., a combination of a digital signal processor (DSP) and a microprocessor, a plurality of microprocessors, at least one microprocessors in conjunction with a DSP core, or any other such configuration).

The memory 214 may be a non-transitory processor-readable storage medium that stores processor-executable instructions. For example, the instructions may include routing communication data relating to the first or second subscription though a corresponding baseband-RF resource chain. The memory 214 may include any suitable internal or external device for storing software and data. Examples of the memory 214 may include, but are not limited to, random access memory RAM, read only memory ROM, floppy disks, hard disks, dongles or other recomp sensor board (RSB) connected memory devices, or the like. The memory 214 may store an operating system (OS), user application software, and/or executable instructions. The memory 214 may also store application data, such as an array data structure.

The general purpose processor 206 and the memory 214 may each be coupled to a baseband modem processor 216. In alternative embodiments, the general purpose processor 206 and the memory 214 may be additionally coupled to one or both of a RF transceiver chip 218b and RF front end 218a. Each SIM in the UE 200 (e.g., the SIM-1 202a and the SIM-2 202b) may be associated with a receive radio and/or a transmit radio. For example, the UE 200 may include a first receive radio (RX1) 240a, a second receive radio (RX2) 240b, and a transmit radio (TX1) 240c. At least one additional receive path or transmit path may be provided to the UE 200. In other words, each subscription may be associated with at least one receive radio and/or at least one transmit radio.

The transmit radio 240c and the receive radios 240a, 240b may be configured by the baseband modem processor 216, the RF transceiver chip 218b, the RF front end 218a, and antennas 220a-220b. One or more of the baseband modem processor 216, the RF transceiver chip 218b, and the RF front end 218a may be coupled to the general purpose processor 206 and/or the memory 214 to perform function described herein. The baseband modem processor 216 may be coupled to the RF transceiver chip 218b. The RF transceiver chip 218b may be coupled to the RF front end 218a. The RF front end 218a may be coupled to the antennas 220a-220b. The baseband modem processor 216 may perform baseband/modem functions (e.g., application processing, multimedia processing, graphics processing, and/or the like) for communications via the subscriptions. The RF transceiver chip 218b may be configured for up/down conversion between the RF and the baseband signals. The RF front end 218a is configured to provide wiring to the antennas 220a-220b and filters for noise and interference cancellation.

The first antenna 220a and the second antenna 220b may be coupled to the first receive radio 240a (via the RF front end 218a). The first antenna 220a and the second antenna 220b may be coupled to the second receive radio 240b (via the RF front end 218a). The first antenna 220a and second antenna 220b may be coupled to the transmit radio 240c (via the RF front end 218a). Each of the first receive radio 240a and the second receive radio 240b may include at least two reception paths, a primary reception path and a diversity reception path. Multiple reception paths may be provided for multiple-input-multiple-output (MIMO) reception. In various embodiments, assigning a subscription to a receive radio includes assigning the same subscription for both the primary reception path and the diversity reception path. The UE 200 may be a dual receive (DR) UE having two receive radios 240a, 240b. In various embodiments relating to carrier aggregation, the first receive radio 240a may be associated with a primary component carrier (PCC). The second receive radio 240b may be associated with a secondary component carrier (SCC) in carrier aggregation.

In some embodiments, the general purpose processor 206, the memory 214, the baseband processor(s) 216, and the RF transceiver chip 218b may be included in the UE 200 as a system-on-chip. In some embodiments, the first and second SIMs 202a, 202b and their corresponding interfaces 204a, 204b may be external to the system-on-chip. Further, various input and output devices may be coupled to components on the system-on-chip, such as interfaces or controllers. Example user input components suitable for use in the UE 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or receive a telephone number. As another example, the request to initiate the outgoing call may be in the form of a voice command received via the microphone 212. Interfaces may be provided between the various software modules and functions in the UE 200 to enable communication between them, as is known in the art.

In some embodiments (not shown), the UE 200 may include, among other things, additional SIM cards, SIM interfaces, a plurality of RF resources associated with the additional SIM cards, and additional antennae for connecting to additional mobile networks.

The UE 200 may include a scheduling unit 230 configured to manage and/or schedule utilization of the first receive radio 240a, the second receive radio 240b, and the transmit radio 240c. For example, the scheduling unit 230 may assign a first subscription and/or a second subscription to be transmitted or received via one or more of the first receive radio 240a, the receive radio 240b, and the transmit radio 240c.

In some embodiments, the scheduling unit 230 may be implemented within the general purpose processor 206. For example, the scheduling unit 230 may be implemented as a software application stored within the memory 214 and executed by the general purpose processor 206. In alternative embodiments, the scheduling unit 230 may be implemented within one or more or all of the baseband modem processor 216, the RF transceiver chip 218b, and the RF front end 218a. In particular embodiments, the scheduling unit 230 may be implemented with the RF transceiver ship 218*b*. Accordingly, such embodiments can be implemented with minimal additional hardware costs.

Other embodiments relate to systems and processes that are implemented with dedicated device hardware specifically configured for performing operations described herein. The scheduling unit 230 may be implemented as a separate hardware component, a processor separate from the general purpose processor 206 and/or a memory separate from the memory 214.

Hardware and/or software for the functions may be incorporated in the UE 200 during manufacturing, for example, as part of the original equipment manufacturer's ("OEM's") configuration of the UE 200. In further embodiments, such hardware and/or software may be added to the UE 200 post-manufacture, such as by installing one or more software applications onto the UE 200.

FIG. 3A is a table 300*a* illustrating examples of port options for a UE, such as the UE 110 or 200 (FIGS. 1-2). Referring to FIGS. 1-3A, a port option 1A 321*a* and a port option 2A 322*a* may be determined by the scheduling unit 230. The table 300*a* may include a port options column 302. The port options column 302 may include various port options of the UE 200. The table 300*a* may also include a first receive radio column 304, a second receive radio column 306, a transmit radio column 308, and a trigger column 310. The first receive radio column 304 may include subscription assignments for the first receive radio 240*a*. The second receive radio column 306 may include subscription assignments for the second receive radio 240*b*. The transmit radio column 308 may include subscription assignments for the transmit radio 240*c*. The trigger column 310 may include events that trigger the corresponding port options listed in the port options column 302.

The port option 1A 321*a* may correspond to a first subscription 330*a* being assigned to the first receive radio 240*a* and a second subscription 340*a* being assigned to the second receive radio 240*b*. In particular embodiments, the first subscription 330*a* (e.g., LTE with eBMBS enabled) may be in a connected mode in which broadcast activity (e.g., temporary mobile group identify (TMGI)) is being actively received by the first receive radio 240*a*. The TMGI may be a unique identifier identifying an eMBMS session or service with the Public Land Mobile Network (PLMN). In particular embodiments, when the first subscription 330*a* is a combination of eMBMS and other LTE features (being assigned to the first receive radio 240*a* simultaneously), the eMBMS may be actively receiving while the other LTE features may be in an idle mode (to monitor pages). The second subscription 340*a* may be in an idle mode in which the second receive radio 240*b* monitor pages of the second subscription 340*a*.

The port option 2A 322*a* may correspond to the first subscription 330*a* being assigned to the second receive radio 240*b* and the second subscription 340*a* being assigned to the first receive radio 240*a*. The scheduling unit 230 may determine to switch from the port option 1A 321*a* to the port option 2A 322*a* in response to a trigger event, such as second subscription-related trigger 360*a*. The second subscription-related trigger 360*a* may be detecting a call, SMS, LU, and/or the like via the second subscription 340*a*. The scheduling unit 230 may detect the second subscription-related trigger 360*a* and assign the second subscription 340*a* to receive with the first receive radio 240*a* in response to the second subscription-related trigger 360*a*. The first receive radio 240*a* may have superior data reception performance (e.g., better data rate) over the second receive radio 240*b*. The scheduling unit 230 may also assign the first subscription 330*a* to the second receive radio 240*b* in response to the second subscription-related trigger 360*a*, instead of suspending the stack for the first subscription 330*a*. In some embodiments, the scheduling unit 230 may assign the second subscription 340*a* to the transmit radio 240*c* in response to the second subscription-related trigger 360*a*.

FIG. 3B is a table 300*b* illustrating examples of various port options. Referring to FIGS. 1-3B, the port options 1B 321*b*, 2B 322*b*, and 2C 322*c* may be determined by the scheduling unit 230. The port options 1B 321*b*, 2B 322*b*, and 2C 322*c* may be particular implementations of one or more of the port options illustrated in the table 300*a*. For example, the port option 1B 321*b* may correspond to the port option 1A 321*a*. The port options 2B 322*b*, 2C 322*c* may correspond to the port option 2A 322*a*. The first subscription 330*a* may be an eMBMS 330*b* (e.g., a LTE subscription enabling the eMBMS 330*b* and other features). The second subscription 340*a* may be a GSM subscription 340*b*, a 1× subscription 340*c*, a shared combination of the GSM subscription 340*b* and the 1× subscription 340*c*, and/or the like. The table 300*b* may include the port options column 302, the first receive radio column 304, the second receive radio column 306, the transmit radio column 308, and the trigger column 310 similar to those described with respect to the table 300*a*.

The port option 1B 321*b* may correspond to the eMBMS 330*b* being assigned to the first receive radio 240*a*. The port option 1B 321*b* may also correspond to the GSM subscription 340*b* and/or the 1× subscription 340*c* being assigned to the second receive radio 240*b*. In some embodiments, the GSM subscription 340*b* and the 1× subscription 340*c* may be assigned to share the second receive radio 240*b*. For example, TMGI may be actively received by the first receive radio 240*a*. The GSM subscription 340*b* and/or the 1× subscription 340*c* may be in an idle mode in which the second receive radio 240*b* may monitor GSM or 1× pages.

The port option 2B 322*b* may correspond to the eMBMS 330*b* being assigned to the second receive radio 240*b* and the GSM subscription 340*b* being assigned to the first receive radio 240*a*. The scheduling unit 230 may determine to switch from the port option 1B 321*b* to the port option 2B 322*b* in response to a GSM trigger event 360*b*. The GSM trigger event 360*b* may be a call, SMS, LU, and/or the like via the GSM subscription 340*b*. The scheduling unit 230 may detect the GSM trigger event 360*b* and assign the GSM subscription 340*b* to receive with the first receive radio 240*a* in response to the GSM trigger event 360*b*. The first receive radio 240*a* may have superior data reception performance (e.g., better data rate) over the second receive radio 240*b*. The scheduling unit 230 may also assign the eMBMS 330*b* to the second receive radio 240*b* in response to the GSM trigger event 360*b*, instead of suspending the stack for the eMBMS 330*b* (or LTE). In some embodiments, the scheduling unit 230 may assign the GSM subscription 340*b* to the transmit radio 240*c* in response to the GSM trigger event 360*b*.

The port option 2C 322*c* may correspond to the eMBMS 330*b* being assigned to the second receive radio 240*b* and the 1× subscription 340*c* being assigned to the first receive radio 240*a*. The scheduling unit 230 may determine to switch from the port option 1B 321*b* to the port option 2C 322*c* in response to a 1× trigger event 360*c*. The 1× trigger event 360*c* may be a call, SMS, LU, and/or the like via the 1× subscription 340*c*. The scheduling unit 230 may detect the 1× trigger event 360*c* and assign the 1× subscription 340*c* to receive with the first receive radio 240*a* in response to the 1× trigger event 360*c*. The first receive radio 240*a* may have superior data reception performance (e.g., better data rate) over the second receive radio 240b. The scheduling unit 230 may also assign the eMBMS 330b to the second receive radio 240b in response to the 1× trigger event 360c, instead of suspending the stack for the eMBMS 330b. In some embodiments, the scheduling unit 230 may assign the 1× subscription 340c to the transmit radio 240c in response to the 1× trigger event 360c.

Figure 3C:
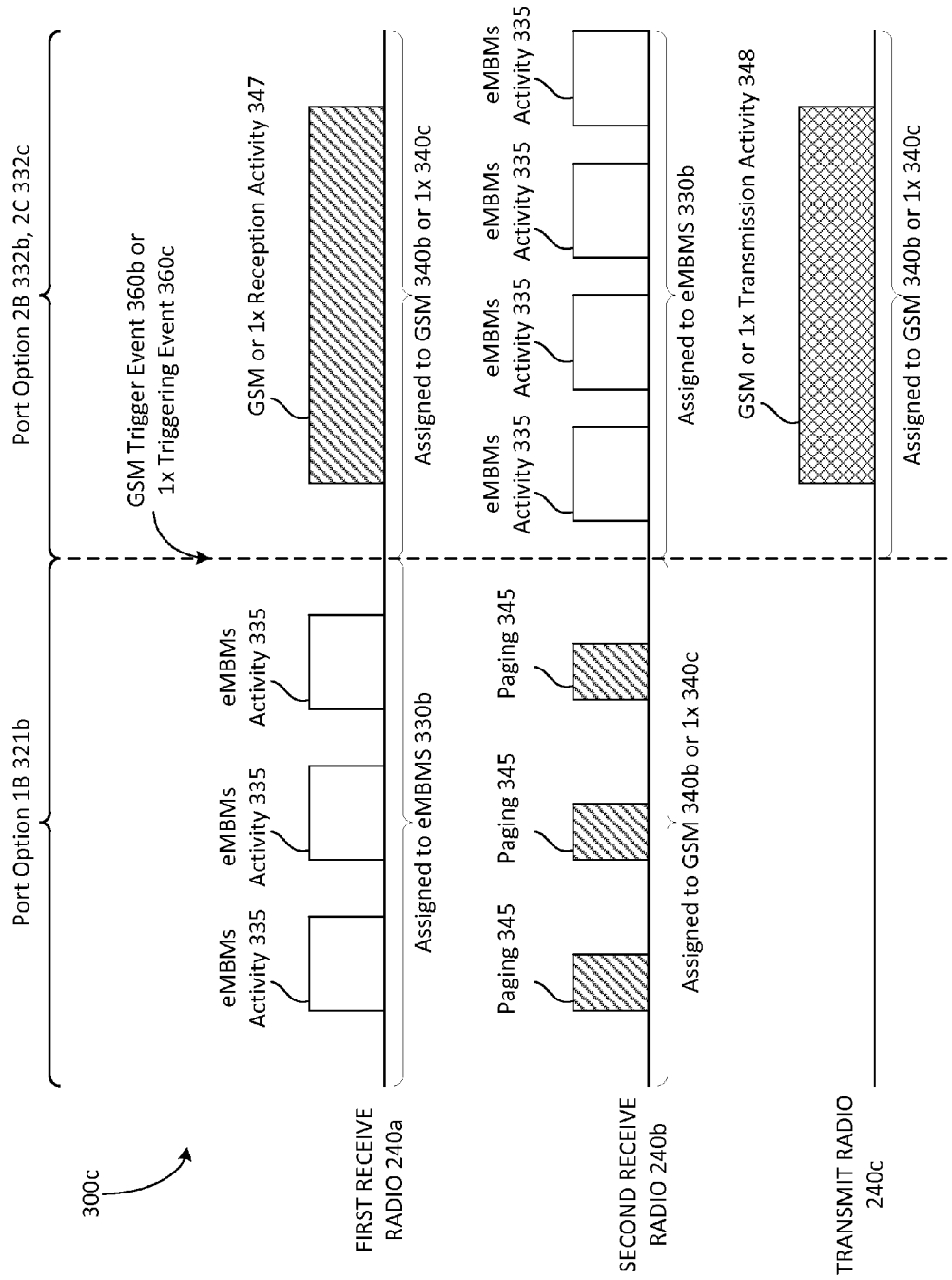
FIG. 3C is a schematic diagram illustrating an example of port option selection method according to various embodiments.

FIG. 3C is a schematic diagram 300c illustrating an example of a port option selection method according to various embodiments. Referring to FIGS. 1-3C, the diagram 300c illustrates the port options 1B 321b, 2B 323b, and 2C 322c. For example, when the port option 1B 321b is selected for the UE 200, the first receive radio 240a may be configured for eMBMS activity 335 (i.e., receiving TMGI and other broadcast activities via the eMBMS 330b). When the port option 1B 321b is selected for the UE 200, the second receive radio 240b may be configured for paging 345 (i.e., reception activity prior to trigger event 360a). The paging 345 may be for the GSM subscription 340b, the 1× subscription 340c, or both (based on arbitration when conflicts arise).

In response to the second subscription-related trigger 360a (which may be the GSM trigger event 360b or the 1× trigger event 360c, as shown), the scheduling unit 230 may select the first receive radio 240a for GSM or 1× reception activity 347 (i.e., assigning the first receive radio 240a to the GSM subscription 340b, the 1× subscription activity 340c, or both). The GSM or 1× reception activity 347 (post-trigger) may be activity related to receiving a call, SMS, LU, and/or the like associated with the GSM subscription 340b, the 1× subscription activity 340c, or both. Therefore, the GSM or 1× reception activity 347 may be another type of reception activity after the trigger event 360c. In response to the second subscription-related trigger 360, the scheduling unit 230 may select the second receive radio 240b for eMBMS activity 335 (i.e., assigning the second receive radio 240b to the eMBMS 330b). The scheduling unit 230 may assign the transmit radio 240c to transmit the transmission activity 348 for the GSM subscription 340b, the 1× subscription activity 340c, or both in response to the second subscription-related trigger 360.

Figure 4:
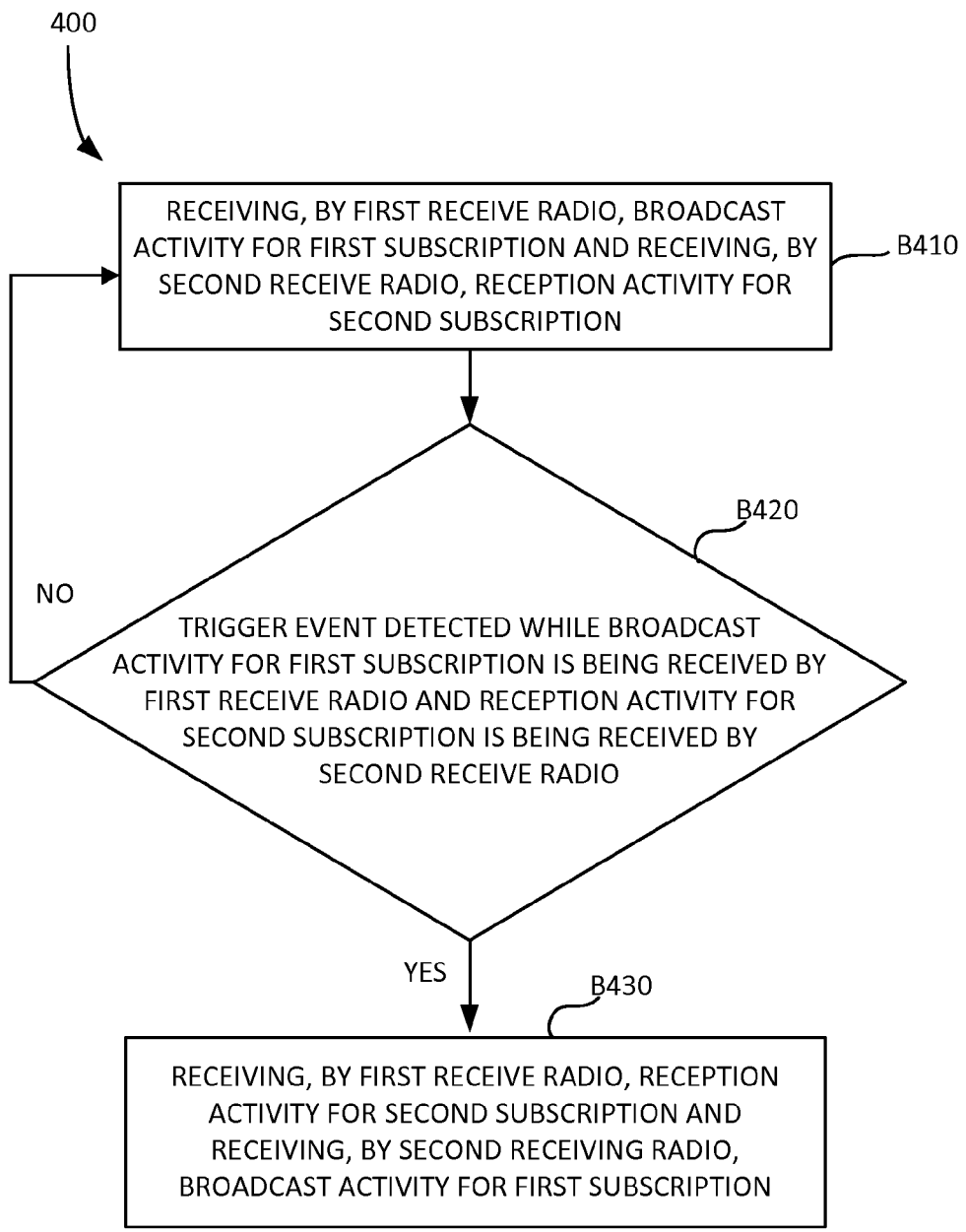
FIG. 4 is a process flowchart diagram illustrating an example of a method according to various embodiments.

FIG. 4 is a process flowchart diagram illustrating an example of a method 400 according to various embodiments. Referring to FIGS. 1-4, the method 400 may correspond to the table 300a, the table 300b, and the diagram 300c. After the UE 200 is initialized, the scheduling unit 230 may configure the UE 200 to receive broadcast activity (e.g., session identification information such as the TMGI) for the first subscription 330a with the first receive radio 240a and receive reception activity (e.g., pages) for the second subscription 340a with the second receive radio 240b, at block B410. For example, the reception activity for the second subscription 340a may be idle activities such as, but not limited to, monitored pages.

Next at block B420, the scheduling unit 230 may be configured to detect the second subscription-related trigger 360a while broadcast activity for the first subscription 330a is being received by the first receive radio 240a and while reception activity for the second subscription 340a is being received by the second receive ratio 240b. When the second subscription-related trigger 360a has not been detected (B420: NO), the UE 200 may continue to receive broadcast activity for the first subscription 330a with the first receive radio 240a and receive reception activity for the second subscription 340a with the second receive radio 240b, at block B410.

On the other hand, when the second subscription-related trigger 360a has been detected (B420: YES), the scheduling unit 230 may configure the UE 200 to receive reception activity for the second subscription 340a with the first receive radio 240a and to receive broadcast activity for the first subscription 330a with the second receive radio 240b, at block B430.

As described herein, the scheduling unit 230 may configure the second receive radio 240b to continue receiving (e.g., the session identification such as TMGI and such) for the first subscription 330a (instead of suspending the first subscription 330a altogether in response to the second subscription-related trigger 360a). The frequency and bandwidth associated with the first subscription 330a and the second subscription 340a may be different. Therefore, the scheduling unit 230 may configure the frequencies (e.g., center frequencies) and bandwidths of the first receive radio 240a and the second receive radio 240b to conform with the frequency and the bandwidth standards of the first subscription 330a and the second subscription 340a, in response to the second subscription-related trigger 360a. The reception activity for the second subscription 340a received with the first receive radio 240a may be active (such as a call, SMS, LU, and/or the like). Accordingly, the reception activity of the second subscription 340a received in response to the second subscription-related trigger 360a may be different from that received before the second subscription-related trigger 360a. The transmission activity 348 may be assigned to the transmit radio 240c in response to the second subscription-related trigger 360a (e.g., 360b, 530c, and the like).

Advantages associated with embodiments described with respect to FIGS. 3A-4 may include allowing broadcast activity for the first subscription 330a to be continuously received in response to the second subscription-related trigger 360a, instead of suspending reception for the first subscription 330a in response to the second subscription-related trigger 360a. Given that detecting the second subscription-related trigger 360a may indicate higher reception priority with respect to the second subscription 340a, reception activity for the second subscription 340a may be received by the first receive radio 240a, which may have superior reception performance as compared to the second receive radio 240b. Therefore, effective resource allocation may be achieved by assigning the receive radio (i.e., the first receive radio 240a) with better performance to receive for the subscription (i.e., the second subscription 340a) with higher reception priority.

FIG. 5A is a table 500a illustrating examples of port options for a UE, such as the UE 110 or 200 (FIGS. 1-2). Referring to FIGS. 1-5A, a port option 3A 523a and a port option 4A 524a may be determined by the scheduling unit 230. The table 500a may include a port options column 502. The port options column 502 may include various port options of the UE 200. The table 500a may also include a first receive radio column 504, a second receive radio column 506, a transmit radio column 508, and a trigger column 510. The first receive radio column 504 may include subscription assignments for the first receive radio 240a. The second receive radio column 506 may include subscription assignments for the second receive radio 240b. The transmit radio column 508 may include subscription assignments for the transmit radio 240c. The trigger column 510 may include events that trigger the corresponding port options listed in the port options column 502.

The port option 3A 523a may correspond to a first subscription 530a being assigned to the first receive radio 240*a* and a second subscription 540*a* being assigned to the second receive radio 240*b*. In particular embodiments, the first subscription 530*a* (e.g., LTE with eBMBS enabled) may be in a connected mode in which broadcast reception (e.g., TMGI) may be actively received by the first receive radio 240*a*. In particular embodiments, when the first subscription 530*a* is a combination of eMBMS and other LTE features (being assigned to the first receive radio 240*a* simultaneously), the eMBMS may be actively receiving while the other LTE features may be in an idle mode (to monitor pages). The second subscription 540*a* may be in an idle mode in which the second receive radio 240*b* monitor pages of the second subscription 540*a*.

The port option 4A 524*a* may correspond to the first subscription 530*a* being assigned to the first receive radio 240*a* and the second subscription 540*a* being assigned to the second receive radio 240*b*. The scheduling unit 230 may determine to maintain the receive radio assignments of the port option 3A 523*a* with the port option 4A 524*a* in response to a trigger event, such as a second subscription-related trigger 560*a*. The second subscription-related trigger 560*a* may be detecting a call, SMS, LU, and/or the like via the second subscription 540*a*. The scheduling unit 230 may detect the second subscription-related trigger 560*a* and assign the second subscription 540*a* to receive with the second receive radio 240*b* in response to the second subscription-related trigger 560*a*. The first receive radio 240*a* which may have superior data reception performance (e.g., better data rate) over the second receive radio 240*b*. The scheduling unit 230 may also assign the first subscription 530*a* to the first receive radio 240*a* in response to the second subscription-related trigger 560*a*, instead of suspending the stack for the first subscription 530*a*. In some embodiments, the scheduling unit 230 may assign the second subscription 540*a* to the transmit radio 240*c* in response to the second subscription-related trigger 560*a*.

FIG. 5B is a table 500*b* illustrating examples of various port options. Referring to FIGS. 1-5B, the port options 3B 523*b*, 4B 524*b*, and 4C 524*c* may be determined by the scheduling unit 230. The port options 3B 523*b*, 4B 524*b*, and 4C 524*c* may be particular implementations of one or more of the port options illustrated in the table 500*a*. For example, the port option 3B 523*b* may correspond to the port option 3A 523*a*. The port options 4B 524*b*, 4C 524*c* may correspond to the port option 4A 524*a*. The first subscription 530*a* may be an eMBMS 530*b* (e.g., a LTE subscription enabling the eMBMS 530*b* and other features). The second subscription 540*a* may be a GSM subscription 540*b*, a 1× subscription 540*c*, a shared combination of the GSM subscription 540*b* and the 1× subscription 540*c*, and/or the like. The table 500*b* may include the port options column 502, the first receive radio column 504, the second receive radio column 506, the transmit radio column 508, and the trigger column 510 similar to those described with respect to the table 500*a*.

The port option 3B 523*b* may correspond to the eMBMS 530*b* being assigned to the first receive radio 240*a*. The port option 3B 523*b* may correspond to the GSM subscription 540*b* and/or the 1× subscription 540*c* being assigned to the second receive radio 240*b*. In some embodiments, the GSM subscription 540*b* and the 1× subscription 540*c* may be assigned to share the second receive radio 240*b*. The eMBMS 530*b* may be actively received. For example, TMGI may be actively received by the first receive radio 240*a*. The GSM subscription 540*b* and/or the 1× subscription 540*c* may be in an idle mode in which the second receive radio 240*b* may monitor GSM or 1× pages associated with the GSM subscription 540*b* and/or the 1× subscription 540*c*.

The port option 4B 524*b* may correspond to the eMBMS 530*b* being assigned to the first receive radio 240*a* and the GSM subscription 540*b* being assigned to the second receive radio 240*b*. The scheduling unit 230 may determine to maintain receiving configurations with respect to the port option 3B 523*b* in response to a GSM trigger event 560*b* (with the port option 4B 524*b*). The GSM trigger event 560*b* may be detecting a call, SMS, LU, and/or the like via the GSM subscription 540*b*. The scheduling unit 230 may detect the GSM trigger event 560*b* and assign (or continue to assign) the GSM subscription 540*b* to receive with the second receive radio 240*a* in response to the GSM trigger event 560*b*. The first receive radio 240*a* may have superior data reception performance (e.g., better data rate) over the second receive radio 240*b*. The scheduling unit 230 may also assign (continue to assign) the eMBMS 530*b* to the first receive radio 240*a* in response to the GSM trigger event 560*b*, instead of suspending the stack for the eMBMS 530*b*. In some embodiments, the scheduling unit 230 may assign the GSM subscription 540*b* to the transmit radio 240*c* in response to the GSM trigger event 560*b*.

The port option 4C 524*c* may correspond to the eMBMS 530*b* being assigned (or continued to be assigned) to the first receive radio 240*a* and the 1× subscription 540*c* being assigned (or continued to be assigned) to the second receive radio 240*b*. The scheduling unit 230 may determine to maintain the receive configurations of the port option 3B 523*b* in response to a 1× trigger event 560*c* (with the port option 4C 524*c*). The 1× trigger event 560*c* may be detecting a call, SMS, LU, and/or the like via the 1× subscription 540*c*. The scheduling unit 230 may detect the 1× trigger event 560*c* and assign the 1× subscription 540*c* to receive or (continue to receive) with the second receive radio 240*b* in response to the 1× trigger event 560*c*. The first receive radio 240*a* may have superior data reception performance (e.g., better data rate) over the second receive radio 240*b*. The scheduling unit 230 may also assign (or continue to assign) the eMBMS 530*b* to the first receive radio 240*a* in response to the 1× trigger event 560*c*, instead of suspending the stack for the eMBMS 530*b*. In some embodiments, the scheduling unit 230 may assign the 1× subscription 540*c* to the transmit radio 240*c* in response to the 1× trigger event 560*c*.

Figure 5C:
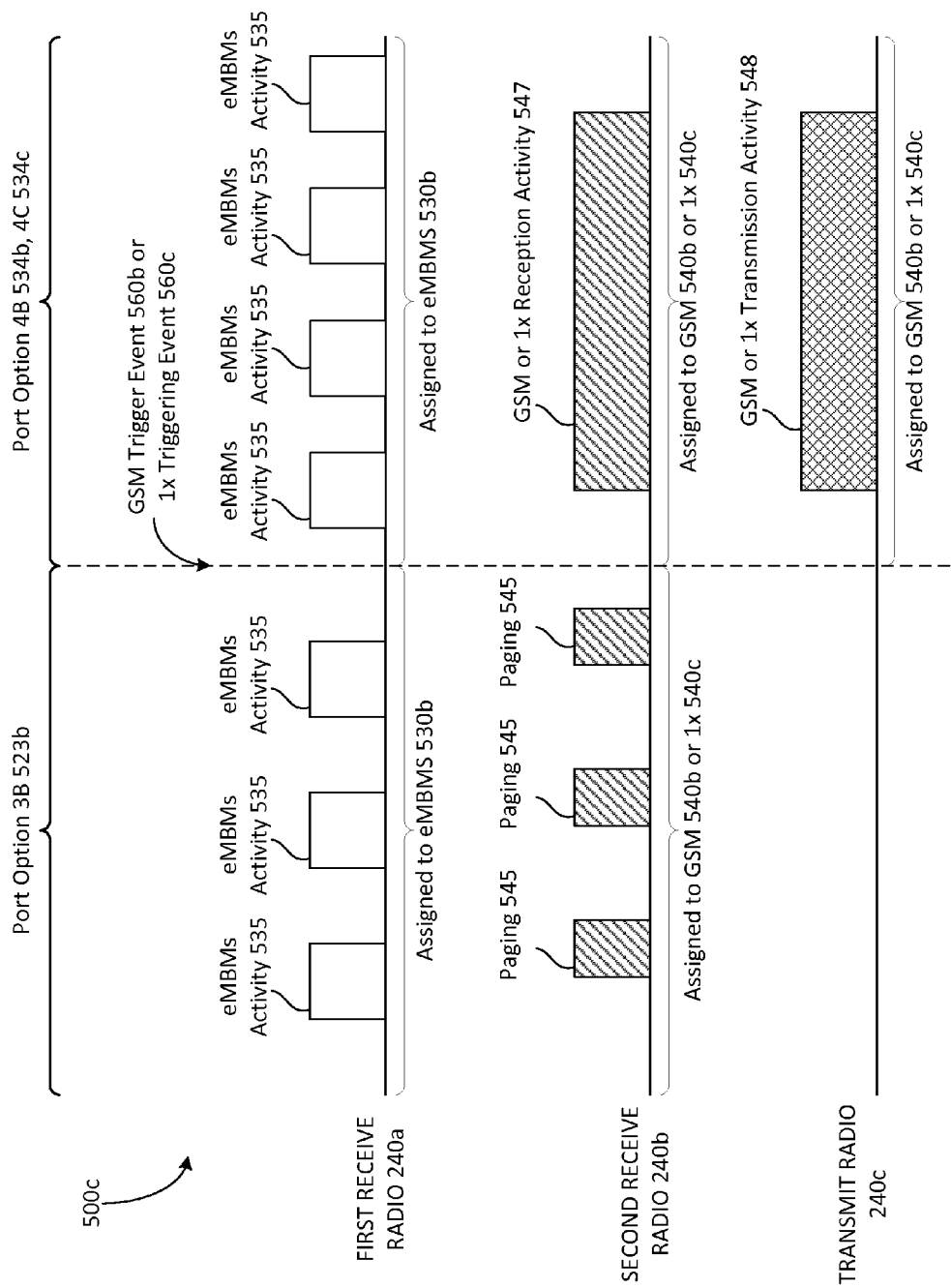
FIG. 5C is a schematic diagram illustrating an example of port option selection method according to various embodiments.

FIG. 5C is a schematic diagram 500*c* illustrating an example of a port option selection method according to various embodiments. Referring to FIGS. 1-5C, the diagram 500*c* illustrates the port options 3B 523*b*, 4B 524*b*, and 4C 524*c*. For example, when the port option 3B 523*b* is selected for the UE 200, the first receive radio 240*a* may be configured for eMBMS activity 535 (i.e., receiving TMGI and other broadcast activities via the eMBMS 530*b*). When the port option 3B 523*b* is selected for the UE 200, the second receive radio 240*b* may be configured for paging 545 (i.e., reception activity prior to trigger event 560*a*). The paging 545 may be for the GSM subscription 540*b*, the 1× subscription 540*c*, or both (based on arbitration when conflicts arise).

In response to the second subscription-related trigger 560*a* (which may be the GSM trigger event 560*b* or the 1× trigger event 560*c*, as shown), the scheduling unit 230 may select (continue to select) the second receive radio 240*b* for GSM or 1× reception activity 547 (i.e., assigning the second receive radio 240*b* to the GSM subscription 540*b*, the 1× subscription activity 540*c*, or both). The GSM or 1× reception activity 547 (post-trigger) may be activity related to receiving a call, SMS, LU, and/or the like associated with the GSM subscription 540b, the 1x subscription activity 540c, or both. In response to the second subscription-related trigger 560, the scheduling unit 230 may select the first receive radio 240a for eMBMS activity 535 (i.e., assigning or continuing to assign the first receive radio 240a to the eMBMS 530b). The scheduling unit 230 may assign the transmit radio 240c to transmit transmission activity 548 for the GSM subscription 540b, the 1x subscription activity 540c, or both in response to the second subscription-related trigger 560a (e.g., 560b, 560c, and the like).

Figure 6:
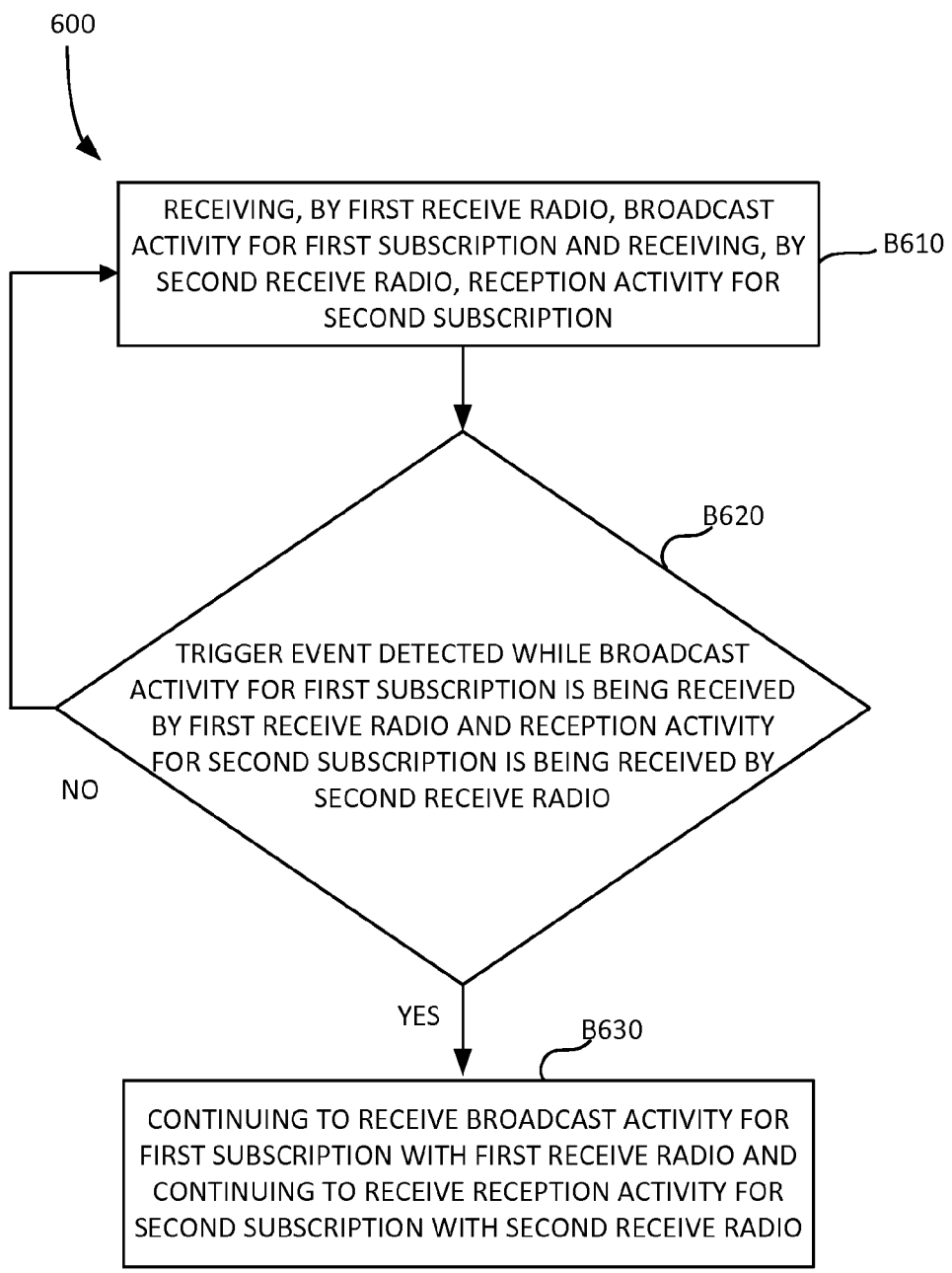
FIG. 6 is a process flowchart diagram illustrating an example of a method according to various embodiments.

FIG. 6 is a process flowchart diagram illustrating an example of a method 600 according to various embodiments. Referring to FIGS. 1-6, the method 600 may correspond to the table 500a, the table 500b, and the diagram 500c. After the UE 200 is initialized, the scheduling unit 230 may configure the UE 200 to receive broadcast activity (e.g., session identification such as the TMGI) for the first subscription 530a with the first receive radio 240a and receive reception activity (e.g., pages) for the second subscription 540a with the second receive radio 240b, at block B610. For example, the reception activity for the second subscription 540a may be idle activity such as, but not limited to, pages.

Next at block B620, the scheduling unit 230 may be configured to detect the second subscription-related trigger 560a (e.g., 560b, 560c, and the like) while broadcast activity for the first subscription 530a is being received by the first receive radio 240a and while reception activity for the second subscription 540a is being received by the second receive ratio 240b. When the second subscription-related trigger 560a has not been detected (B620: NO), the UE 200 continue to receive broadcast activity for the first subscription 530a with the first receive radio 240a and receive reception activity for the second subscription 540a with the second receive radio 240b, at block B610.

On the other hand, when the second subscription-related trigger 560a has been detected (B620: YES), the UE 200 may continue receive reception activity for the second subscription 540a with the second receive radio 240b and to receive broadcast activity for the first subscription 530a with the first receive radio 240a, at block B630b. As described herein, the UE 200 may continue receiving broadcast activity (e.g., the session identification such as TMGI or the like) for the first subscription 530a (instead of suspending the first subscription 530a altogether in response to the second subscription-related trigger 560a). The reception activity for the second subscription 540a received with the second receive radio 240b in response to the second subscription-related trigger 560a may be active (such as a call, SMS, LU, and/or the like). The reception activity for the second subscription 540a received in response to the second subscription-related trigger 560a may be different from that received before the second subscription-related trigger 560a. The transmission activity 548 may be assigned to the transmit radio 240c in response to the second subscription-related trigger 560a (e.g., 560b, 560c, and the like).

Advantages associated with embodiments described with respect to FIGS. 5A-6 may include allowing broadcast activity for the first subscription 530a to be continuously received in response to the second subscription-related trigger 560a, instead of suspending reception for the first subscription 530a in response to the second subscription-related trigger 560a. Given that the first subscription 530a would be continuously received with the same radio (e.g., the first receive radio 240a), frequency switching may not be necessary. Accordingly, little or no interruption of reception may be experienced with respect to the first subscription 530a, thus improving user experience with respect to the first subscription 530a.

FIG. 7A is a table 700a illustrating examples of port option for a UE, such as the UE 110 or 200 (FIGS. 1-2). Referring to FIGS. 1-7A, a port option 5A 725a and a port option 6A 726a may be determined by the scheduling unit 230. The table 700a may include a port options column 702. The port options column 702 may include various port options of the UE 200. The table 700a may also include a first receive radio column 704, a second receive radio column 706, a transmit radio column 708, and a trigger column 710. The first receive radio column 704 may include subscription assignments for the first receive radio 240a. The second receive radio column 706 may include subscription assignments for the second receive radio 240b. The transmit radio column 708 may include subscription assignments for the transmit radio 240c. The trigger column 710 may include events that trigger the corresponding port options listed in the port options column 702.

The port option 5A 725a may correspond to a first subscription 730a and a broadcast activity 740a being assigned to the first receive radio 240a. In particular embodiments, the broadcast activity 740a may be enabled by the first subscription 730a. The port option 5A 725a may also correspond to the first subscription 730a and a second subscription 750a being assigned to the second receive radio 240b. Furthermore, the port option 5A 725a may additionally correspond to the first subscription 730a being assigned to the transmit radio 240c. In particular embodiments, the first subscription 730a (e.g., a LTE subscription) and the broadcast activity 740a (e.g., an eMBMS) may be in a connected mode for actively receiving by the first receive radio 240a. Moreover, mobile data or other types of reception activity for first subscription 730a may also be actively received by the second receive radio 240b (for carrier aggregation purposes) and transmitted via the transmit radio 240c. For example, the first (LTE) subscription may be actively receiving mobile data via both the first and second receive radios 240a, 240b. The eMBMS may be actively receiving multimedia broadcast activity (e.g., TMGI) for a first service. The broadcast activity 740a may be received on the PCC for the port option 5A 725a. The second subscription 750a (e.g., a 1x subscription, GSM subscription, a combination thereof, and/or the like) may be in an idle mode in which the second receive radio 240b may monitor pages associated with the second subscription 750a.

The port option 6A 726a may correspond to the first subscription 730a and the second subscription 750a being assigned to the first receive radio 240a and the broadcast activity 740a being assigned to the second receive radio 240b. Activity for first subscription 730a may be actively transmitted via the transmit radio 240c. The scheduling unit 230 may determine to switch from the port option 5A 725a to the port option 6A 726a in response to a trigger event, such as a broadcast-related trigger 760a. The broadcast-related trigger 760a may be an indication or request to receive for the broadcast activity 740a on the SCC (i.e., switching channels from the PCC to the SCC). The scheduling unit 230 may first detect or receive the indication or request to receive the broadcast activity 740a on the SCC. Next, the scheduling unit 230 may determine whether receiving the broadcast activity 740a on the SCC (e.g., the second receive radio 240b) may cause collision with the second subscription 750a. If collision is determined to be above a predetermined tolerance level, then the second subscription 750a may be received by the first receive radio 240a instead of by the second receive radio 240b. The first receive radio 240a which may have superior data reception performance (e.g., better data rate) over the second receive radio 240b.

In some embodiments, the scheduling unit 230 may also assign the first subscription 730a to the first receive radio 240a only (and not to the second receive radio 240b) in response to the broadcast-related trigger 760a. In other words, the scheduling unit 230 may halt assigning the first subscription 730a to the second receive radio 240b in response to the broadcast-related trigger 760a. In other embodiments, instead of receiving the first subscription 730a by the first receive radio 240a only, the first subscription 730a may be assigned to both the first receive radio 240a and the second receive radio 240b. In such embodiments, the first subscription 730a and the broadcast activity 740a may share the second receive radio 240b. The first subscription 730a and the broadcast activity 740a may be related, such as in the embodiments in which the first subscription 730a is a LTE subscription and the broadcast activity 740a is an eMBMS subscription. In such embodiments, the first subscription 730a and the broadcast activity 740a will not compete for the receive radio if the first subscription 730a and the broadcast activity 740a are assigned to a same receive radio.

FIG. 7B is a table 700b illustrating examples of various port options. Referring to FIGS. 1-7B, the port options 5B 725b, 6B 726b, and 6C 726c may be determined by the scheduling unit 230. The port options 5B 725b, 6B 726b, and 6C 726c may be particular implements of one or more of the port options illustrated in the table 700a. For example, the port option 5B 725b may correspond to the port option 5A 725a. The port options 6B 726b, 6C 726c may correspond to the port option 6A 726a. The first subscription 730a may be an LTE subscription 730b. The broadcast activity 740a may be an eMBMS 740b. The second subscription 750a may be a 1× subscription 750b, a GSM subscription 750c, a shared combination of the GSM subscription 750c and the 1× subscription 750c, and/or the like. The table 700b may include the port options column 702, the first receive radio column 704, the second receive radio column 706, the transmit radio column 708, and the trigger column 710 similar to those described with respect to the table 700a.

The port option 5B 725b may correspond to the LTE subscription 730b and the eMBMS 740b being assigned to the first receive radio 240a. The port option 5B 725b may also correspond to the LTE subscription 730b being assigned to the second receive radio 240b, to which the GSM subscription 750c and/or the 1× subscription 750b may also be assigned. The port option 5B 725b may additionally include the LTE subscription 730b being assigned to the transmit radio 240c. In other words, the LTE subscription 730b may benefit from carrier aggregation. The LTE subscription 730b and the eMBMS 740b may be active. For example, mobile data may be received for the LTE subscription 730b by the first receive radio 240a and the second receive radio 240b. TMGI may be received for the eMBMS 740b by the first receive radio 240a. The GSM subscription 750c and/or the 1× subscription 750b may be in an idle mode in which the second receive radio 240b monitor GSM or 1× pages.

The port option 6B 726b may correspond to the eMBMS 740b being assigned to the second receive radio 240b. The port option 6B 726b may also correspond to the LTE subscription 730b, the 1× subscription 750b, and the GSM subscription 750c being assigned to the first receive radio 240a. The port option 5B 725b may additionally include the LTE subscription 730b being assigned to the transmit radio 240c. The scheduling unit 230 may determine to switch from the port option 5B 725b to the port option 6B 726b in response to the eMBMS 740b is requested or indicated to be on a Configurable Secondary Cell (C-SCell) 760b (i.e., the UE self-configures on the SCC). The scheduling unit 230 may adopt port option 6B 726b (namely, switching the 1× subscription 750b and the GSM subscription 750c to be received via the first receive radio 240a) if the scheduling unit 230 determines that the eMBMS 740b may collide with one or more of the 1× subscription 750b and the GSM subscription 750c above a predetermined threshold level. The first receive radio 240a may have superior data reception performance (e.g., better data rate) over the second receive radio 240b.

The port option 6C 726c may correspond to the LTE subscription 730b and eMBMS 740b being assigned to the second receive radio 240b. The port option 6C 726c may also correspond to the LTE subscription 730b, the 1× subscription 750b, and the GSM subscription 750c being assigned to the first receive radio 240a. The port option 6C 726c may additionally include the LTE subscription 730b being assigned to the transmit radio 240c. The scheduling unit 230 may determine to switch from the port option 5B 725b to the port option 6C 726c in response to the eMBMS 740b is requested or indicated to be on a Secondary Cell (SCell) 760c (i.e., on the SCC). The scheduling unit 230 may adopt port option 6C 726c (namely, switching the 1× subscription 750b and the GSM subscription 750c to be received via the first receive radio 240a) if the scheduling unit 230 determines that the eMBMS 740b may collide with one or more of the 1× subscription 750b and the GSM subscription 750c above a predetermined threshold level. The first receive radio 240a may have superior data reception performance (e.g., better data rate) over the second receive radio 240b.

Figure 7C:
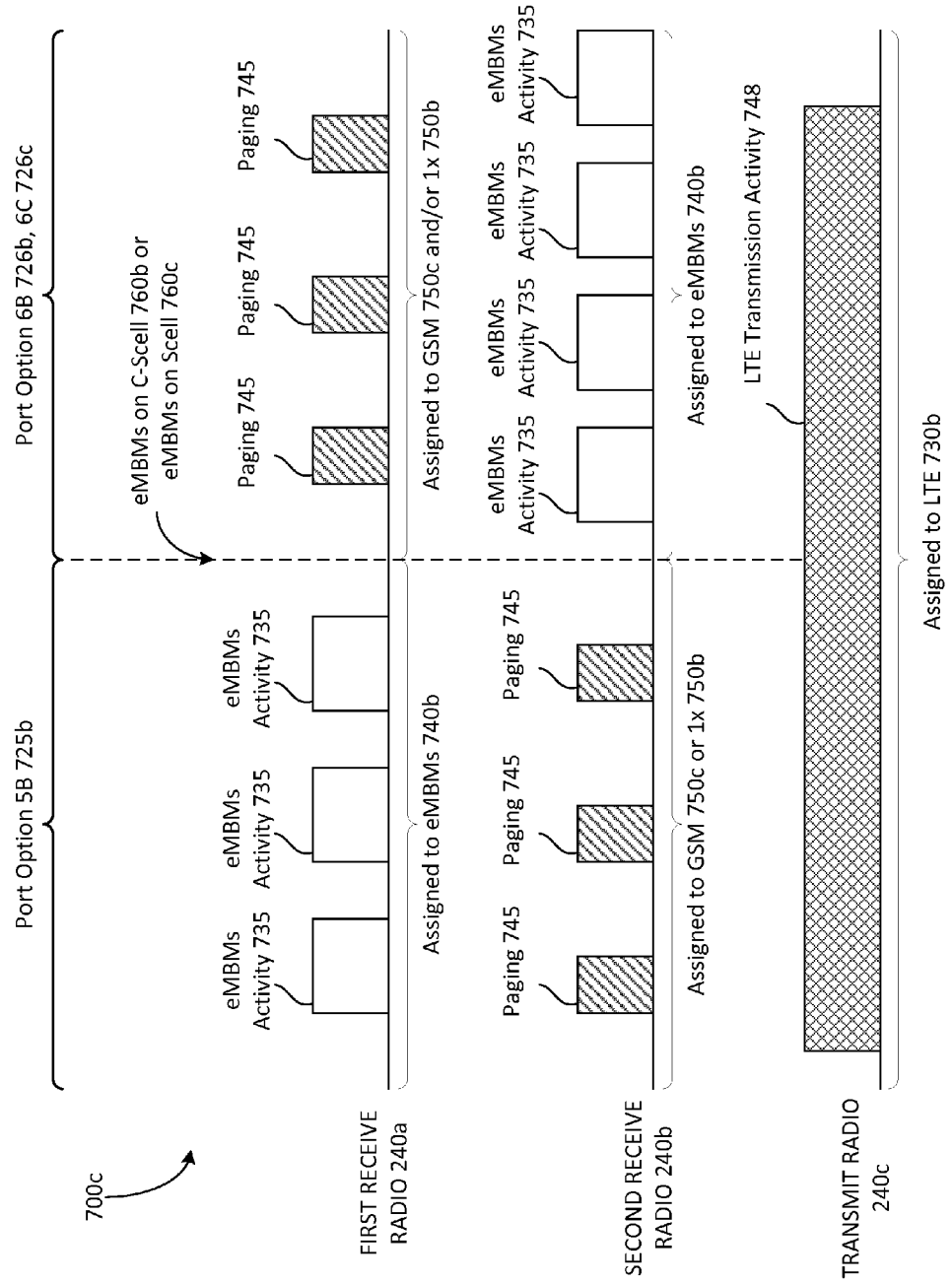
FIG. 7C is a schematic diagram illustrating an example of port option selection method according to various embodiments.

FIG. 7C is a schematic diagram 700c illustrating an example of a port option selection method according to various embodiments. Referring to FIGS. 1-7C, the diagram 700c illustrates the port options 5B 725b, 6B 726b, and 6C 726c. For example, when the port option 5B 725b is selected for the UE 200, the first receive radio 240a may be configured for eMBMS activity 735 (i.e., receiving TMGI via the eMBMS 740b). The eMBMS activity 735 corresponding to the port option 5B 725b may be receiving broadcast activity (e.g., TMGI 1) for a first service (which is received on the PCC). When the port option 5B 725b is selected for the UE 200, the second receive radio 240b may be configured for paging 745. The paging 745 may be for the GSM subscription 750c, the 1× subscription 750b, or both (based on arbitration when conflicts arise). The LTE subscription 730b (activities not shown in FIG. 7C for clarity) may be receivable via both the first receive radio 240a and the second receive radio 240b.

With respect to port options 6B 726b and 6C 726c, in response to the eMBMS 740b being requested or indicated to be on the C-SCell 760b or the SCell 760c, the scheduling unit 230 may select the first receive radio 240a for paging 745 (i.e., assigning the first receive radio 240a to the 1× subscription activity 750b, the GSM subscription 750c, or both). In response to the eMBMS 740b being requested or indicated to be on the C-SCell 760b or the SCell 760c, the scheduling unit 230 may select the second receive radio 240b for eMBMS activity 735 (i.e., assigning the second receive radio 240b to the eMBMS 740b). The eMBMS activity 735 corresponding to the port option 6B 726b or 6C 726c may be receiving broadcast activity (e.g., TMGI 2) for a second service (which is received on the SCC). The scheduling unit 230 may assign the transmit radio 240c to transmit activity for the LTE subscription 730b with respect to each of the port options 5B 725b, 6B 726b, and 6C 726c.

Figure 8:
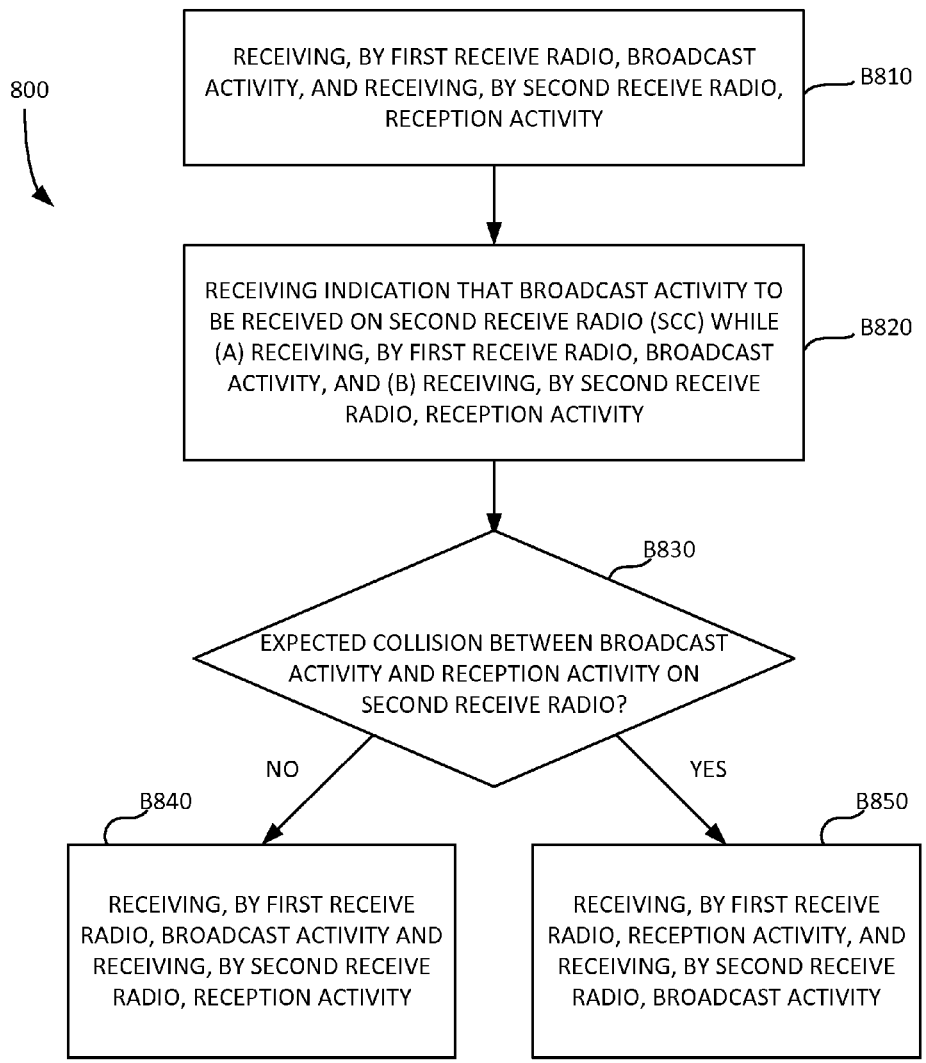
FIG. 8 is a process flowchart diagram illustrating an example of a method according to various embodiments.

FIG. 8 is a process flowchart diagram illustrating an example of a method 800 according to various embodiments. Referring to FIGS. 1-8, the method 800 may correspond to the table 700a, the table 700b, and the diagram 700c. After the UE 200 is initialized, the scheduling unit 230 may configure, at block B810a, the UE 200 to receive the broadcast activity 740a (e.g., the eMBMS 740b) with the first receive radio 240a and to receive the reception activity of the second subscription 750a (e.g., the 1× subscription 750b, the GSM subscription 750c, a shared combination thereof, and/or the like) with the second receive radio 240b (SCC). In addition, the UE 200 may be configured by the scheduling unit 230 to receive the first subscription 730a (e.g., the LTE subscription 730b) with one or both of the receive radios. The broadcast activity 740a received via the first receive radio 240a at block B810 may be for a first service (e.g., TMGI 1).

Next at block B820, the scheduling unit 230 may receive an indication (request) that the broadcast activity 740a (and reception activity of the first subscription 730a) is to be received on the second receive radio 240b (SCC) while (a) the broadcast activity 740a is received by the first receive radio 240a and (b) reception activity of the second subscription 750a (and reception activity of the first subscription 730a) is received by the second receive radio 240b. In some embodiments, the indication may be corresponding to a desire (by a user of the UE 200 or otherwise automatically) to receive a second service different from the first service, with the broadcast activity 740a. The indication may be an indication to receive the broadcast activity 740a on the C-SCell 760b or to receive the broadcast activity 740a on the SCell 760c.

In response to receiving the indication at block B820, the scheduling unit 230 may determine whether collision between the broadcast activity 740a and the reception activity of the second subscription 750a on the second receive radio 240b is expected to occur or if the expected collision is substantial (i.e., above a threshold), at block B830. In some embodiments, collision between the broadcast activity 740a and the reception activity of the second subscription 750a on the second receive radio 240b may automatically be assumed (e.g., B830: ALWAYS YES). In other embodiments, the expected collision between the broadcast activity 740a and the reception activity of the second subscription 750a may be found when the expected collision exceeds a predetermined threshold (e.g., 0%, 5%, 10%, 20%, and/or the like).

When expected collision is found (B830: YES), the scheduling unit 230 may configure the UE 200 to receive reception activity for the first and second subscriptions 730a, 750a on the first receive radio 240a, and to receive at least the broadcast activity 740a on the second receive radio 240b (SCC), at block B850. In the embodiments in which the indication concerns receiving the broadcast activity 740a on the C-SCell 760b (determined at block B820), only the broadcast activity 740a may be received on the second receive radio 240b. In the embodiments in which the indication concerns receiving the broadcast activity 740a on the SCell 760c (determined at block B820a), the first subscription 730a as well as the broadcast activity 740a may be received on the second receive radio 240b.

On the other hand, when expected collision is not found (B830: NO), the scheduling unit 230 may configure the UE 200 to receive the first subscription 730a on the first receive radio 240a, and to receive at least the second subscriptions 750a and the broadcast activity 740a on the second receive radio 240b (SCC), at block B840. The LTE transmission activity 748 may be continued to be received on the transmit radio 240c regardless of whether collision is found.

With respect to one or more of blocks B830 or B850, the broadcast activity 740a received in response to receiving the indication (at block B820) and/or in response to determining the presence of intolerable expected collision (at block B830) may be for a second service (e.g., TMGI 2) different from the first service.

Accordingly, user experience with respect to the multimedia broadcast activity received via the eMBMS 740b on the SCC may be improved, given that collision-causing subscriptions (e.g., the 1× subscription 750b and the GSM subscription 750c) may be moved to another receive radio. For example, if the eMBMS 740b is to be received via the PCC on the first receive radio 240a, the collision-causing subscriptions may continue to be received via the SCC on the second receive radio 240b. Therefore, embodiments described with respect to FIGS. 7A-8B may avoid waiting for the eNB to reconfigure carrier aggregation. Otherwise, the UE 200 may request the eNB to reconfigure from PCC to SCC by sending eMBMs interest indication.

Figure 9:
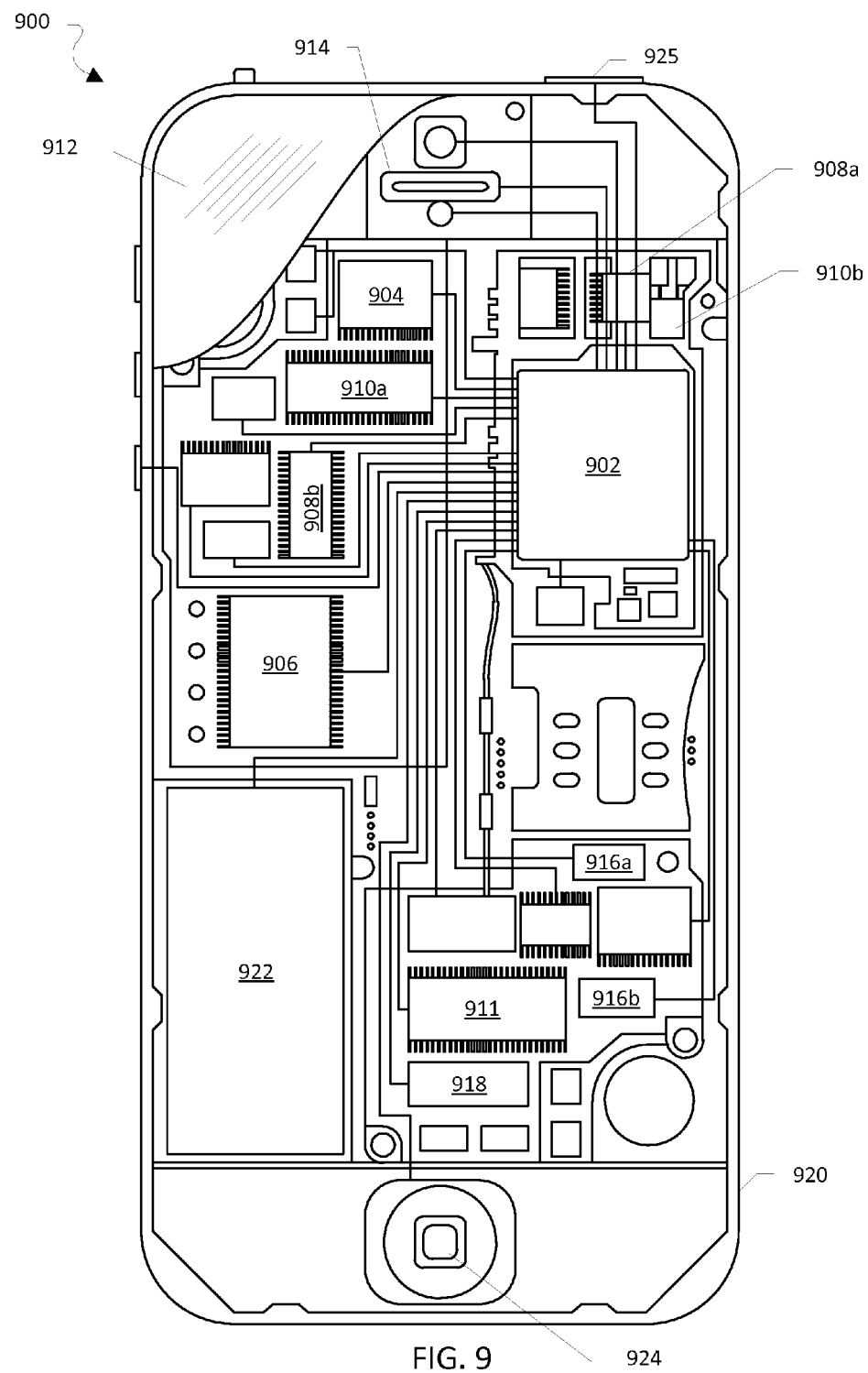
FIG. 9 is a component block diagram of a user equipment suitable for use with various embodiments.

The various embodiments may be implemented in any of a variety of UEs, an example of which is illustrated in FIG. 9, as a UE 900, which may correspond to the UE 110, 200 in FIGS. 1-2. As such, the UE 900 may implement the process and/or the apparatus of FIGS. 1-8, as described herein.

With reference to FIGS. 1-9, the UE 900 may include a processor 902 coupled to a touchscreen controller 904 and an internal memory 906. The processor 902 may be one or more multi-core integrated circuits designated for general or specific processing tasks. The memory 906 may be volatile or non-volatile memory, and may also be secure and/or encrypted memory, or unsecure and/or unencrypted memory, or any combination thereof. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the UE 900 need not have touch screen capability.

The UE 900 may have one or more cellular network transceivers 908a, 908b coupled to the processor 902 and to two or more antennae 910 and configured for sending and receiving cellular communications. The transceivers 908 and antennae 910a, 910b may be used with the above-mentioned circuitry to implement the various embodiment methods. Each of the cellular network transceivers 908a, 908b may one or more of the RF transceiver chip 218b, RF front end 218a, and/or the like. Each of the antennas 910a, 910b may be one or more of the wireless antennas 220a-220b. The UE 900 may include two or more SIM cards 916a, 916b, corresponding to SIM-1 204a and SIM-2 204b, coupled to the transceivers 908a, 908b, and/or the processor 902. The UE 900 may include a cellular network wireless modem chip 911 (e.g., the baseband modem processor 216) that enables communication via a cellular network and is coupled to the processor.

The UE 900 may include a peripheral device connection interface 918 coupled to the processor 902. The peripheral device connection interface 918 may be singularly configured to accept one type of connection, or multiply configured to accept various types of physical and communication connections, common or proprietary, such as USB, FireWire, Thunderbolt, or PCIe. The peripheral device connection interface 918 may also be coupled to a similarly configured peripheral device connection port (not shown).

The UE 900 may also include speakers 914 for providing audio outputs. The UE 900 may also include a housing 920, constructed of a plastic, metal, or a combination of materials, for containing all or some of the components discussed herein. The UE 900 may include a power source 922 coupled to the processor 902, such as a disposable or rechargeable battery. The rechargeable battery may also be coupled to a peripheral device connection port (not shown) to receive a charging current from a source external to the UE 900. The UE 900 may also include a physical button 924 for receiving user inputs. The UE 900 may also include a power button 925 for turning the UE 900 on and off The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Various modifications to embodiments described herein will be readily apparent to those skilled in the art, and the generic principles defined herein may be applied to some embodiments without departing from the spirit or scope of the disclosure. Thus, the present disclosure is not intended to be limited to the embodiments shown herein but is to be accorded the widest scope consistent with the following claims and the principles and novel features described herein.

What is claimed is:

1. A method for scheduling subscriptions in a user equipment (UE) having at least a first receive radio and a second receive radio, comprising:
   receiving, by the first receive radio, a broadcast activity for a first subscription;
   receiving, by the second receive radio, a reception activity for a second subscription;
   detecting a trigger event while the broadcast activity for the first subscription is being received by the first receive radio and the reception activity for the second subscription is being received by the second receive radio; and
   in response to detecting the trigger event:
      receiving, by the first receive radio, the reception activity for the second subscription; and
      receiving, by the second receive radio, the broadcast activity for the first subscription.

2. The method of claim 1, wherein the trigger event is associated with the second subscription.

3. The method of claim 2, wherein the trigger event is detecting at least one of:
   a call via the second subscription,
   Short Messaging Service (SMS) via the second subscription, and
   Location Update (LU) via the second subscription.

4. The method of claim 2, wherein:
   the reception activity for the second subscription comprises a first reception activity and a second reception activity;
   the first reception activity is received prior to detecting the trigger event; and
   the second reception activity is receive in response to detecting the triggering event.

5. The method of claim 4, wherein the first reception activity and the second reception activity are different reception activities.

6. The method of claim 4, wherein the first reception activity comprises receiving pages of the second subscription.

7. The method of claim 4, wherein the second reception activity comprises at least one of:
receiving a call via the second subscription,
receiving a Short Messaging Service (SMS) via the second subscription, and
receiving a Location Update (LU) via the second subscription.

8. The method of claim 1, wherein the broadcast activity for the first subscription is an evolved Multimedia Broadcast Multicast Service (eMBMS) broadcast activity.

9. The method of claim 1, wherein the second subscription is at least one of a Global Standard for Mobile (GSM) subscription and Code Division Multiple Access 1× Radio Transmission Technology (1×) subscription.

10. The method of claim 1, further comprising transmitting, by a transmit radio of the UE, transmission activity for the second subscription in response to detecting the trigger event.

11. The method of claim 1, further comprising:
in response to the trigger event:
continuing to receive, by the first receive radio, broadcast activity for the first subscription; and;
continuing to receive, by the second receive radio, reception activity for the second subscription.

12. The method of claim 11, further comprising transmitting, by a transmit radio of the UE, transmission activity for the second subscription in response to detecting the trigger event.

13. A system for scheduling subscriptions in a user equipment (UE), comprising:
a first receive radio;
a second receive radio; and
a processor, wherein:
the processor is configured to cause the first receive radio to receive a broadcast activity for a first subscription;
the processor is configured to cause the second receive radio to receive a reception activity for a second subscription;
the processor is configured to detect a trigger event while the broadcast activity for the first subscription is being received by the first receive radio and the reception activity for the second subscription is being received by the second receive radio; and
in response to detecting the trigger event:
the processor is configured to cause the first receive radio to receive the reception activity for the second subscription; and
the processor is configured to cause the second receive radio to receive the broadcast activity for the first subscription.

14. The system of claim 13, wherein the trigger event is detecting at least one of:
a call via the second subscription,
Short Messaging Service (SMS) via the second subscription, and
Location Update (LU) via the second subscription.

15. The system of claim 13, wherein:
the reception activity for the second subscription comprises a first reception activity and a second reception activity;
the first reception activity is received prior to detecting the trigger event; and
the second reception activity is receive in response to detecting the triggering event.

16. The system of claim 15, wherein the first reception activity and the second reception activity are different reception activities.

17. The system of claim 13, wherein the second reception activity comprises at least one of:
receiving a call via the second subscription,
receiving a Short Messaging Service (SMS) via the second subscription, and
receiving a Location Update (LU) via the second subscription.

18. The system of claim 13, wherein the processor is further configured to cause the first receive radio to continue receiving the broadcast activity for the first subscription, and to cause the second receive radio to continue to receiving reception activity for the second subscription.

19. A method for scheduling subscriptions in a user equipment (UE) having at least a first receive radio and a second receive radio, comprising:
receiving, by the first receive radio, a broadcast activity;
receiving, by a second receive radio, a reception activity;
receiving an indication that the broadcast activity is to be received on the second receive radio while (a) receiving, by the first receive radio, the broadcast activity and (b) receiving, by the second receive radio, the reception activity;
determining whether an expected collision will occur between the broadcast activity and the reception activity; and
receiving, by the first receive radio, the reception activity in response to determining that the expected collision will occur between the broadcast activity and the reception activity.

20. The method of claim 19, further comprising receiving, by the second receive radio, the broadcast activity in response to determining that the expected collision will occur between the broadcast activity and the reception activity.

21. The method of claim 19, wherein the broadcast activity is an evolved Multimedia Broadcast Multicast Service (eMBMS) broadcast activity.

22. The method of claim 19, wherein the reception activity is associated with at least one of:
a Global Standard for Mobile (GSM) subscription; and
a Code Division Multiple Access 1× Radio Transmission Technology (1×) subscription.

23. The method of claim 19, wherein receiving the indication that the broadcast activity is to be received on the second receive radio comprises receiving a request that the broadcast activity is to be received on a Supplemental Component Carrier (SCC).

24. The method of claim 19, further comprising transmitting, by a transmit radio, a transmission activity, wherein the indication is received while the transmission activity is being transmitted.

25. The method of claim 19, further comprising:
receiving, by the first receive radio, the broadcast activity in response to determining that the expected collision will not occur between the broadcast activity and the reception activity; and
receiving, by the second receive radio, the reception activity in response to determining that the expected collision will not occur between the broadcast activity and the reception activity.

26. A system for scheduling subscriptions in a user equipment (UE), comprising:
a first receive radio;
a second receive radio; and
a processor, wherein:
the processor is configured to cause the first receive radio to receive a broadcast activity;
the processor is configured to cause the second receive radio to receive a reception activity;
the processor is configured to receiving an indication that the broadcast activity is to be received on the second receive radio while (a) the broadcast activity is received by the first receive radio, and (b) the reception activity is received by the second receive radio;
the processor is configured to determine whether an expected collision will occur between the broadcast activity and the reception activity; and
the processor is configured to cause the first receive radio to receive the reception activity in response to determining that the expected collision will occur between the broadcast activity and the reception activity.

* * * * *